United States Patent
Bae et al.

(10) Patent No.: US 10,431,183 B2
(45) Date of Patent: *Oct. 1, 2019

(54) WIRELESS DEVICE DISPLAYING IMAGES AND MATCHING RESOLUTION OR ASPECT RATIO FOR SCREEN SHARING DURING WI-FI DIRECT SERVICE

(71) Applicant: LG ELECTRONICS INC., Seoul (KR)

(72) Inventors: Kyungnam Bae, Seoul (KR); Jeonghwan Hwang, Seoul (KR); Chiho Shin, Seoul (KR); Sunho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,735

(22) Filed: May 11, 2018

(65) Prior Publication Data

US 2018/0261185 A1     Sep. 13, 2018

Related U.S. Application Data

(63) Continuation of application No. 15/711,893, filed on Sep. 21, 2017, now Pat. No. 9,978,337, which is a (Continued)

(30) Foreign Application Priority Data

Feb. 26, 2016    (KR) .................. 10-2016-0023542

(51) Int. Cl.
  *H04N 21/485* (2011.01)
  *H04N 21/443* (2011.01)
  (Continued)

(52) U.S. Cl.
  CPC ......... *G09G 5/005* (2013.01); *G06F 3/04847* (2013.01); *G06F 3/04886* (2013.01);
  (Continued)

(58) Field of Classification Search
  None
  See application file for complete search history.

(56) References Cited

U.S. PATENT DOCUMENTS 8,752,113 B1    6/2014  Good et al.
9,756,126 B2    9/2017  Miyake
(Continued)

FOREIGN PATENT DOCUMENTS

EP    2717567    4/2014
EP    2808780    12/2014
(Continued)

OTHER PUBLICATIONS

European Patent Office Application Serial No. 161750963, Search Report dated Jul. 4, 2017, 5 pages.

(Continued)

*Primary Examiner* — Martin Mushambo
(74) *Attorney, Agent, or Firm* — Lee Hong Degerman Kang Waimey

(57) ABSTRACT

A wireless device supporting Wi-Fi Direct service includes: a display; a communication unit; and a controller configured to cause: transmitting resolution information including a plurality of resolutions that are supported by the wireless device to a second wireless device; receiving an entire image including a first image and a second image from the second wireless device if a resolution of the first image is not one of the plurality of resolutions; displaying the first image by removing the second image from the received entire image when the entire image is received; and receiving the first image from the second wireless device without the second (Continued)

| Bits | Index | Interpretation |
|---|---|---|
| 0 | 0 | 640 x 480 p60 |
| 1 | 1 | 720 x 480 p60 |
| 2 | 2 | 720 x 480 i60 |
| 3 | 3 | 720 x 576 p50 |
| 4 | 4 | 720 x 576 i50 |
| 5 | 5 | 1280 x 720 p30 |
| 6 | 6 | 1280 x 720 p60 |
| 7 | 7 | 1920 x 1080 p30 |
| 8 | 8 | 1920 x 1080 p60 |
| 9 | 9 | 1920 x 1080 i60 |
| 10 | 10 | 1280 x 720 p25 |
| 11 | 11 | 1280 x 720 p50 |
| 12 | 12 | 1920 x 1080 p25 |
| 13 | 13 | 1920 x 1080 p50 |
| 14 | 14 | 1920 x 1080 i50 |
| 15 | 15 | 1280 x 720 p24 |
| 16 | 16 | 1920 x 1080 p24 |
| 31:17 | - | Reserved |

Table 2 : Supported CEA Resolutions/Refresh Rates image if the resolution of the first image is included in the resolution information, the second image being an image that is added to the first image such that a resolution of the received entire image corresponds to one of the plurality of resolutions.

34 Claims, 27 Drawing Sheets

Related U.S. Application Data continuation of application No. 15/169,578, filed on May 31, 2016, now Pat. No. 9,805,688.

(51) Int. Cl.
| | |
|---|---|
| G09G 5/00 | (2006.01) |
| H04N 1/00 | (2006.01) |
| H04N 21/2343 | (2011.01) |
| H04N 21/2365 | (2011.01) |
| H04N 21/2662 | (2011.01) |
| H04N 21/4402 | (2011.01) |
| H04N 21/6437 | (2011.01) |
| G06F 3/0484 | (2013.01) |
| G06F 3/0488 | (2013.01) |
| G06F 3/14 | (2006.01) |
| G06T 3/40 | (2006.01) |
| H04N 21/4363 | (2011.01) |

(52) U.S. Cl.
CPC .......... *G06F 3/1454* (2013.01); *G06T 3/4092* (2013.01); *H04N 1/00442* (2013.01); *H04N 21/2365* (2013.01); *H04N 21/234363* (2013.01); *H04N 21/234372* (2013.01); *H04N 21/2662* (2013.01); *H04N 21/43637* (2013.01); *H04N 21/4438* (2013.01); *H04N 21/440263* (2013.01); *H04N 21/440272* (2013.01); *H04N 21/4858* (2013.01); *H04N 21/6437* (2013.01); *G06F 2203/04803* (2013.01); *G06T 2200/16* (2013.01); *G09G 2320/0606* (2013.01); *G09G 2340/0407* (2013.01); *G09G 2340/0492* (2013.01); *G09G 2354/00* (2013.01); *G09G 2370/16* (2013.01)

(56) References Cited

U.S. PATENT DOCUMENTS

| | | | | |
|---|---|---|---|---|
| 9,854,323 | B2 | 12/2017 | Baek | |
| 2003/0126266 | A1* | 7/2003 | Peles | H04L 67/1027 709/228 |
| 2009/0195546 | A1* | 8/2009 | Kawabuchi | H04N 21/00 345/473 |
| 2009/0289944 | A1* | 11/2009 | Teramoto | G06F 21/608 345/473 |
| 2010/0161716 | A1* | 6/2010 | Kajos | H04N 21/2221 709/203 |
| 2011/0283334 | A1* | 11/2011 | Choi | G06F 3/04883 725/148 |
| 2012/0079551 | A1* | 3/2012 | Isozaki | H04N 21/4104 725/118 |
| 2013/0076918 | A1* | 3/2013 | Park | H04N 1/00251 348/207.11 |
| 2013/0346562 | A1* | 12/2013 | Kim | H04L 65/608 709/219 |
| 2014/0026068 | A1* | 1/2014 | Park | G06F 3/0482 715/748 |
| 2014/0215052 | A1* | 7/2014 | Seibert | H04L 41/069 709/224 |
| 2014/0267435 | A1* | 9/2014 | Choe | G06T 11/60 345/660 |
| 2014/0282728 | A1* | 9/2014 | Matsunaga | G06F 3/0488 725/38 |
| 2014/0359493 | A1* | 12/2014 | Hong | G06F 3/1454 715/761 |
| 2014/0376793 | A1* | 12/2014 | Lee | G06T 7/0012 382/131 |
| 2015/0005630 | A1* | 1/2015 | Jung | A61B 8/565 600/437 |
| 2015/0145750 | A1* | 5/2015 | Shin | G06F 3/1454 345/2.2 |
| 2015/0193187 | A1* | 7/2015 | Kimn | G06F 3/1454 345/1.2 |
| 2016/0034245 | A1* | 2/2016 | Karunakaran | G06F 3/1454 345/2.2 |
| 2017/0249919 | A1 | 8/2017 | Bae et al. | |
| 2018/0025697 | A1 | 1/2018 | Bae et al. | |

FOREIGN PATENT DOCUMENTS

| | | |
|---|---|---|
| EP | 2985993 | 2/2016 |
| KR | 1020140011857 | 1/2014 |
| KR | 1020150067521 | 6/2015 |
| WO | 2009112547 | 9/2009 |
| WO | 2014129681 | 8/2014 |

OTHER PUBLICATIONS

PCT International Application No. PCT/KR2016/005286, International Search Report dated Nov. 10, 2016, 3 pages.
European Patent Office Application Serial No. 16175096.3, Notice of Allowance dated Aug. 3, 2018, 7 pages.

* cited by examiner

FIG. 7A

| Bits | Index | Interpretation |
|---|---|---|
| 0 | 0 | 800 x 480 p30 |
| 1 | 1 | 800 x 480 p60 |
| 2 | 2 | 854 x 480 p30 |
| 3 | 3 | 854 x 480 p60 |
| 4 | 4 | 864 x 480 p30 |
| 5 | 5 | 864 x 480 p60 |
| 6 | 6 | 640 x 360 p30 |
| 7 | 7 | 640 x 360 p60 |
| 8 | 8 | 960 x 540 p30 |
| 9 | 9 | 960 x 540 p60 |
| 10 | 10 | 848 x 480 p30 |
| 11 | 11 | 848 x 480 p60 |
| 31 : 12 | - | Reserved |

Table 1 : Supported HH Resolutions/Refresh Rates

FIG. 7B

| Bits | Index | Interpretation |
|---|---|---|
| 0 | 0 | 640 x 480 p60 |
| 1 | 1 | 720 x 480 p60 |
| 2 | 2 | 720 x 480 i60 |
| 3 | 3 | 720 x 576 p50 |
| 4 | 4 | 720 x 576 i50 |
| 5 | 5 | 1280 x 720 p30 |
| 6 | 6 | 1280 x 720 p60 |
| 7 | 7 | 1920 x 1080 p30 |
| 8 | 8 | 1920 x 1080 p60 |
| 9 | 9 | 1920 x 1080 i60 |
| 10 | 10 | 1280 x 720 p25 |
| 11 | 11 | 1280 x 720 p50 |
| 12 | 12 | 1920 x 1080 p25 |
| 13 | 13 | 1920 x 1080 p50 |
| 14 | 14 | 1920 x 1080 i50 |
| 15 | 15 | 1280 x 720 p24 |
| 16 | 16 | 1920 x 1080 p24 |
| 31 : 17 | - | Reserved |

Table 2 : Supported CEA Resolutions/Refresh Rates

FIG. 7C

| Bits | Index | Interpretation |
|---|---|---|
| 0 | 0 | 800 x 600 p30 |
| 1 | 1 | 800 x 600 p60 |
| 2 | 2 | 1024 x 768 p30 |
| 3 | 3 | 1024 x 768 p60 |
| 4 | 4 | 1152 x 864 p30 |
| 5 | 5 | 1152 x 864 p60 |
| 6 | 6 | 1280 x 768 p30 |
| 7 | 7 | 1280 x 768 p60 |
| 8 | 8 | 1280 x 800 p30 |
| 9 | 9 | 1280 x 800 p60 |
| 10 | 10 | 1360 x 768 p30 |
| 11 | 11 | 1360 x 768 p60 |
| 12 | 12 | 1366 x 768 p30 |
| 13 | 13 | 1366 x 768 p60 |
| 14 | 14 | 1280 x 1024 p30 |
| 15 | 15 | 1280 x 1024 p60 |
| 16 | 16 | 1400 x 1050 p30 |
| 17 | 17 | 1400 x 1050 p60 |
| 18 | 18 | 1440 x 900 p30 |
| 19 | 19 | 1440 x 900 p60 |
| 20 | 20 | 1600 x 900 p30 |
| 21 | 21 | 1600 x 900 p60 |
| 22 | 22 | 1600 x 1200 p30 |
| 23 | 23 | 1600 x 1200 p60 |
| 24 | 24 | 1680 x 1024 p30 |
| 25 | 25 | 1680 x 1024 p60 |
| 26 | 26 | 1680 x 1050 p30 |
| 27 | 27 | 1680 x 1050 p60 |
| 28 | 28 | 1920 x 1200 p30 |
| 31 : 17 | - | Reserved |

Table 3 : Supported VESA Resolutions/Refresh Rates

FIG. 7D

| | | |
|---|---|---|
| M3 | request (src->snk) | GET_PARAMETER rtsp://localhost/wfd1.0 RTSP/1.0<br>CSeq: i+1<br>Content-Type: text / parameters<br>Content-Length: 141<br><br>wfd_video_formats —710<br>wfd_audio_codecs<br>wfd_3d_video_formats<br>wfd_content_protection<br>wfd_display_edid<br>wfd_coupled_sink<br>wfd_client_rtp_ports |
| | response (snk->src) | RTSP / 1.0 200 OK<br>CSeq: i+1<br>Content-Length: 290<br>Content-Type: text / parameters<br><br>wfd_video_formats: 00 00 01 01 00000001 00000000 00000000 00 0000 0000 00 none none  730<br>wfd_audio_codecs: LPCM 00000003 00<br>wfd_3d_video_formats: none<br>wfd_content_protection: none<br>wfd_display_edid: none<br>wfd_coupled_sink: none<br>wfd_client_rtp_ports: RTP / AVP / UDP ; unicast 1023 0 mode = play |

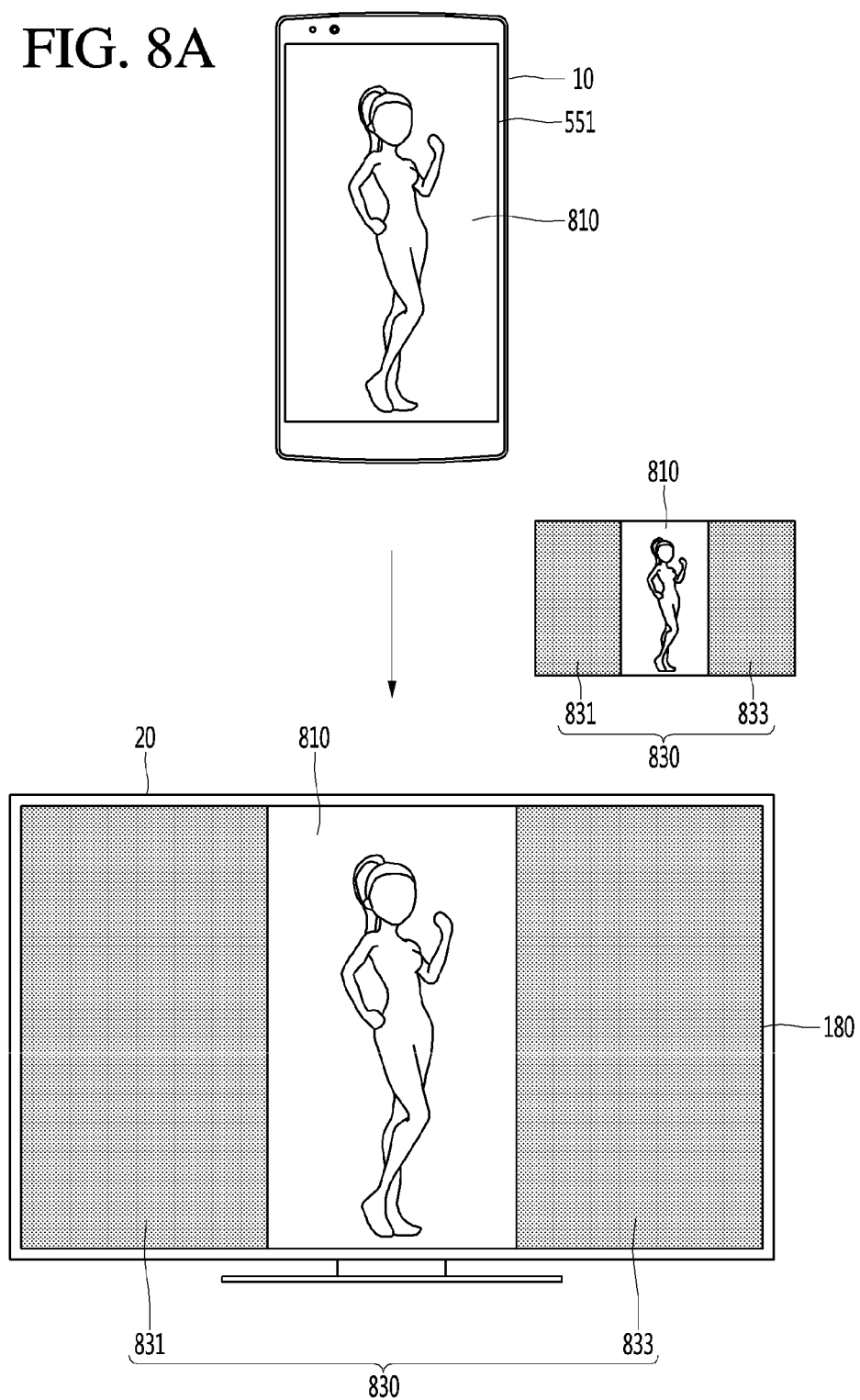

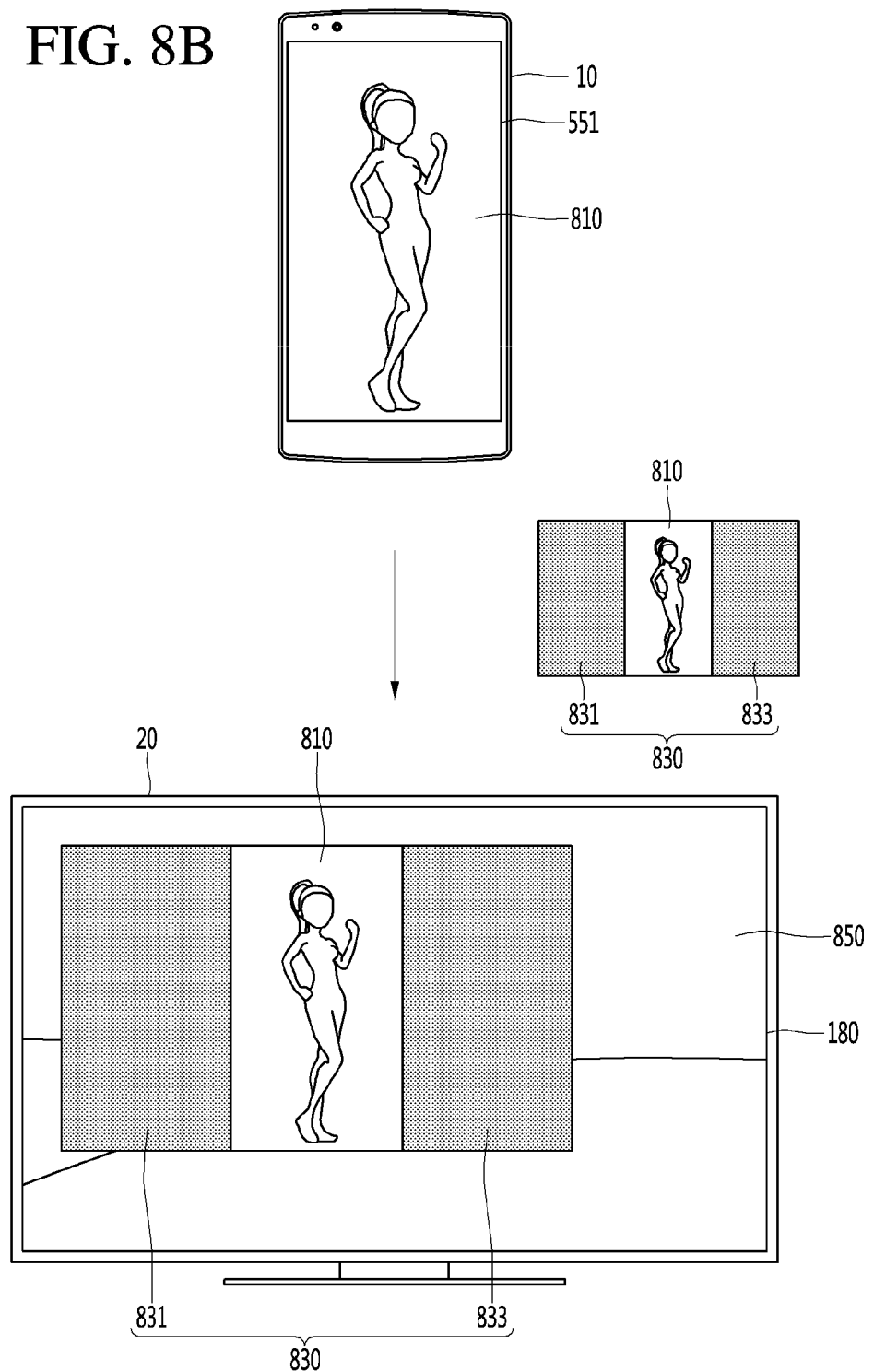

WIRELESS DEVICE DISPLAYING IMAGES AND MATCHING RESOLUTION OR ASPECT RATIO FOR SCREEN SHARING DURING WI-FI DIRECT SERVICE

CROSS-REFERENCE TO RELATED APPLICATIONS

This application is a continuation of U.S. patent application Ser. No. 15/711,893, filed on Sep. 21, 2017, now U.S. Pat. No. 9,978,337, which is a continuation of U.S. patent application Ser. No. 15/169,578, filed on May 31, 2016, now U.S. Pat. No. 9,805,688, which claims the benefit of earlier filing date and right of priority to Korean Patent Application No. 10-2016-0023542, filed on Feb. 26, 2016, the contents of which are all hereby incorporated by reference herein in its entirety.

BACKGROUND

The present disclosure relates to a wireless device.

With the recent development of information communication technologies, various wireless communication technologies are under development. Among them, a wireless local area network (WLAN) is a technology for wirelessly accessing Internet in homes, businesses, or specific service providing areas based on a wireless frequency technique by using portable terminals such as Personal Digital Assistants (PDAs), laptop computers, and Portable Multimedia Players (PMPs).

As a direct communication technology for allowing devices to be connected to each other easily without an access point (AP) that is required in a WLAN system, the introduction of Wi-Fi Direct or Wi-Fi peer-to-peer (P2P) is discussed. According to a Wi-Fi Direct standard technology, devices are connected without complex setting processes and in order to provide various services to users, data exchanging operations at a communication speed of a typical WLAN system can be supported.

Various Wi-Fi supporting devices have been used recently, and among them, the number of Wi-Fi Direct supporting devices for communication between Wi-Fi devices without requiring APs has been increasing. The Wi-Fi Alliance (WFA) discusses a technology for introducing a platform that supports various services using Wi-Fi Direct link (for example, send, play, display, and print). This can be referred to as Wi-Fi Direct Service (WFDS).

Display service in WFDS is a service for allowing screen sharing between P2P devices. The screen sharing service is also referred to as a screen mirroring technique in that a wireless device displays the same image through image transmission.

However, since the aspect ratio or resolution does not fit during image transmission between P2P devices, an existing screen sharing service includes and delivers an unnecessary image such as a black image (or a letter box) at the top/bottom or left/right. Accordingly, due to an unnecessary image that is displayed in addition to an image displayed by a source device, it is in the way of users watching the image.

Additionally, during screen mirroring, a wireless device such as a mobile phone can deliver an image not including a black image from the beginning. However, if the mobile phone is disposed in a horizontal direction, it transmits only a vertical screen in a state of being disposed in a vertical direction and does not transmit a horizontal screen.

SUMMARY

Embodiments remove an unnecessary image inserted due to the mismatch of the resolution or aspect ratio when a screen sharing service is provided during Wi-Fi Direct service between two wireless devices.

Embodiments provide an image corresponding to a placement direction of a wireless device if a screen sharing service is provided during the Wi-Fi Direct service.

In one embodiment, a first wireless device for supporting Wi-Fi Direct service includes: a display; a communication unit configured to communicate with a second wireless device; and a controller configured to: cause the communication unit to transmit resolution information to the second wireless device by using Real-Time Streaming Protocol (RTSP), the resolution information including a plurality of resolutions that are supported by the first wireless device; cause the communication unit to receive an entire image including a first image and a second image from the second wireless device if a resolution of the first image is not one of the plurality of resolutions; cause the display to display the first image by removing the second image from the received entire image; and cause the communication unit to receive the first image from the second wireless device without the second image if the resolution of the first image is included in the resolution information, wherein the second image is an image that is added to the first image such that a resolution of the received entire image corresponds to one of the plurality of resolutions.

In one aspect, the resolution of the entire image is selected by the second wireless device from the plurality of resolutions.

The controller may be further configured to cause the communication unit to receive, from the second wireless device, a message indicating that an image having the resolution that is selected from the plurality of resolutions is to be delivered by using the RTSP.

In one aspect, the second image may be a black image.

In one aspect, the first image may be an image that is currently displayed by the second wireless device when the entire image or the first image is received.

The controller may be further configured to cause the display to: display an image of media content via an entire screen of the display prior to the receiving of the entire image from the second wireless device; and display the first image via a partial screen of the display by removing the second image after receiving the entire image.

In one aspect, the first image may be displayed overlapping the image of media content.

The controller may be further configured to cause the display to display an image adjustment window for controlling at least one of a size or transparency of the first image such that the image adjustment window is displayed on a first area of the display while the first image is displayed on a second area of the display.

The controller may be further configured to cause the first image to decrease its size in response to an input applied via the image adjustment window such that the decreased size first image overlaps partially with the image of media content.

The controller may be further configured to cause the first image to increase its transparency in response to an input applied via the image adjustment window such that the image of media content is visible through the first image with the increased transparency.

The controller may be further configured to: cause the display to display a control window including at least one virtual button for controlling an operation of the second wireless device on a first area of the display while the first image is displayed on a second area of the display; and control an operation of the second wireless device in response to an input applied via the at least one virtual button.

The controller may be further configured to cause the display to display the second image that is restored at a top/bottom or left/right portion of the first image in response to an input for selecting the first image displayed via the partial screen.

The controller may be further configured to: cause the display to display a control window including at least one virtual button for controlling an operation of the second wireless device on an area of the second image; and control an operation of the second wireless device in response to an input applied via the at least one virtual button.

The controller may be further configured to cause the display to: display the first image on an entire screen of the display without the second image; and display at least one image adjustment window for adjusting a size or a position of the first image, the at least one image adjustment window overlapping the first image.

In one aspect, the resolution of the first image that is currently displayed by the second wireless device is not included in the plurality of resolutions when a display mode of the second wireless device is a portrait mode.

The controller may be further configured to automatically switch the first image to a landscape mode when the display mode of the second wireless device is switched from the portrait mode to the landscape mode.

In one aspect, each of resolutions supportable by the first wireless device corresponds to an aspect ratio of which a horizontal length is longer than a vertical length.

The controller may be further configured to detect the second wireless device prior to performing connection setup to communicate with the second wireless device.

In another embodiment, a method for controlling a first wireless device supporting Wi-Fi Direct service includes: communicating with a second wireless device via a communication unit; transmitting resolution information to the second wireless device by using Real-Time Streaming Protocol (RTSP), the resolution information including a plurality of resolutions that are supported by the first wireless device; receiving an entire image including a first image and a second image from the second wireless device if a resolution of the first image that is currently displayed by the second wireless device is not one of the plurality of resolutions; and displaying, on a display, the first image by removing the second image from the received entire image, wherein the second image is an image that is added to the first image such that a resolution of the received entire image corresponds to one of the plurality of resolutions.

The details of one or more embodiments are set forth in the accompanying drawings and the description below. Other features will be apparent from the description and drawings, and from the claims.

BRIEF DESCRIPTION OF THE DRAWINGS

FIGS. 7A to 7D are tables illustrating resolution information that a WFD sink transmits to a WFD source according to an embodiment of the present invention.

FIG. 8A to 8C are views that if display service for allowing a WFD source and a WFD sink to share a screen is provided, an image other than an image the WFD source displays currently is included and transmitted to the WFD sink.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
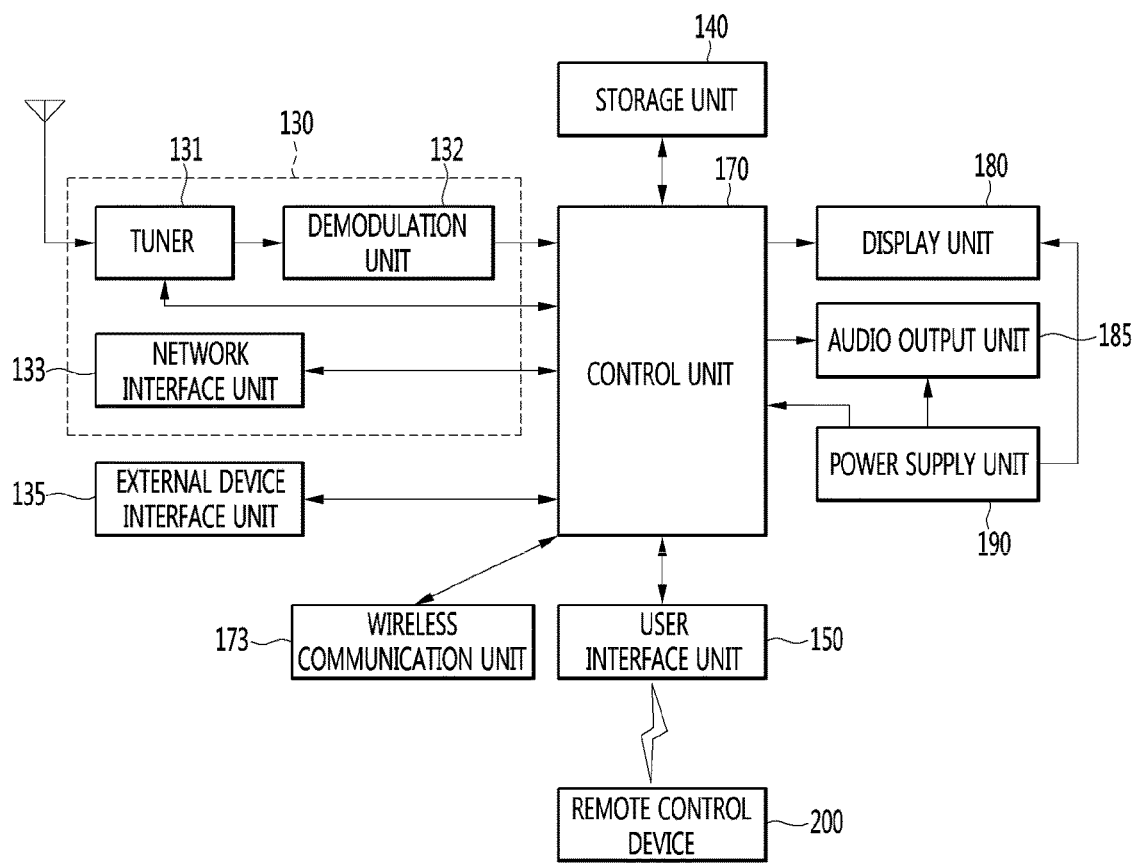
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 130 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
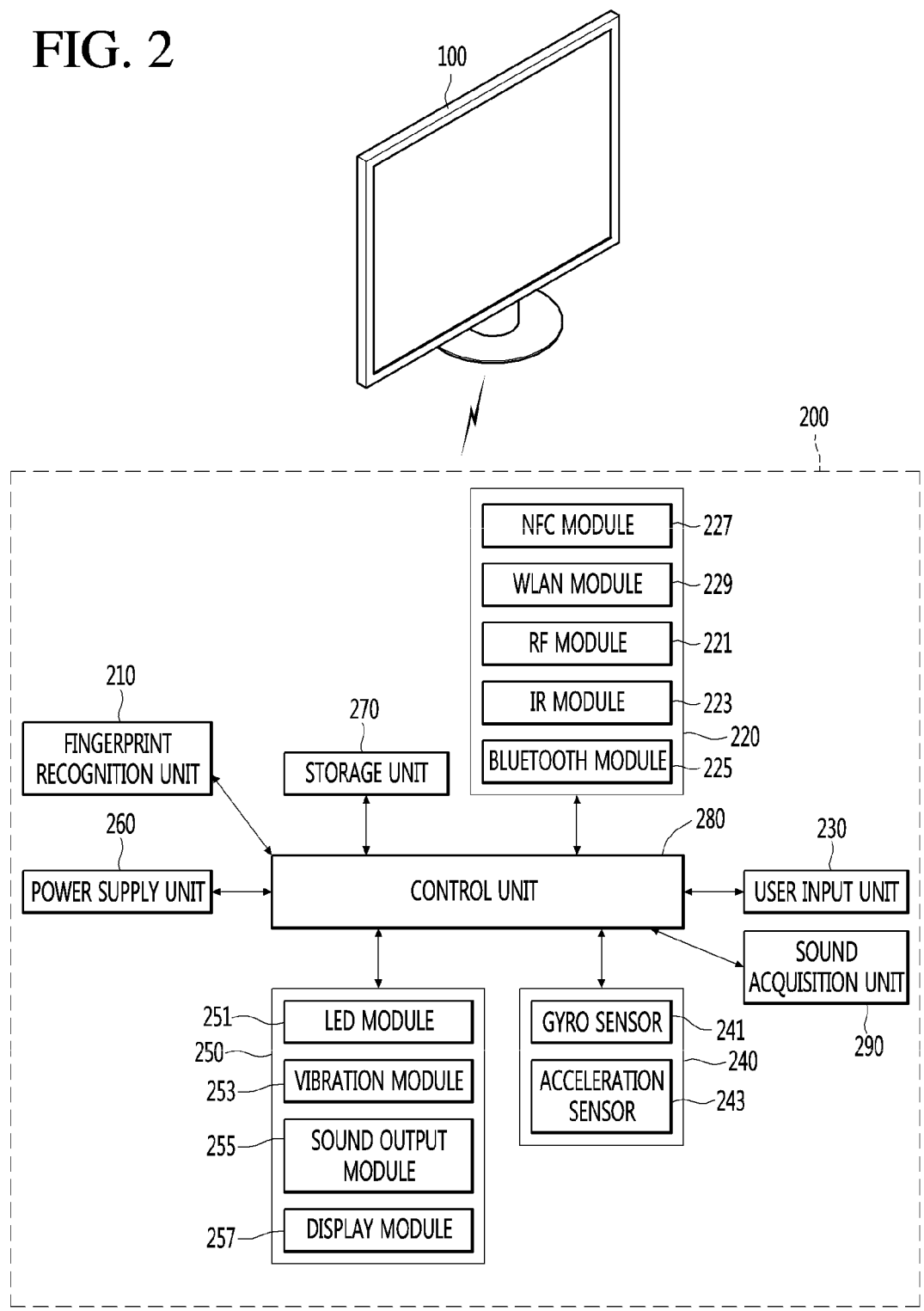
FIG. 2 is a block diagram illustrating a remote control device according to an embodiment of the present invention.
Figure 3:
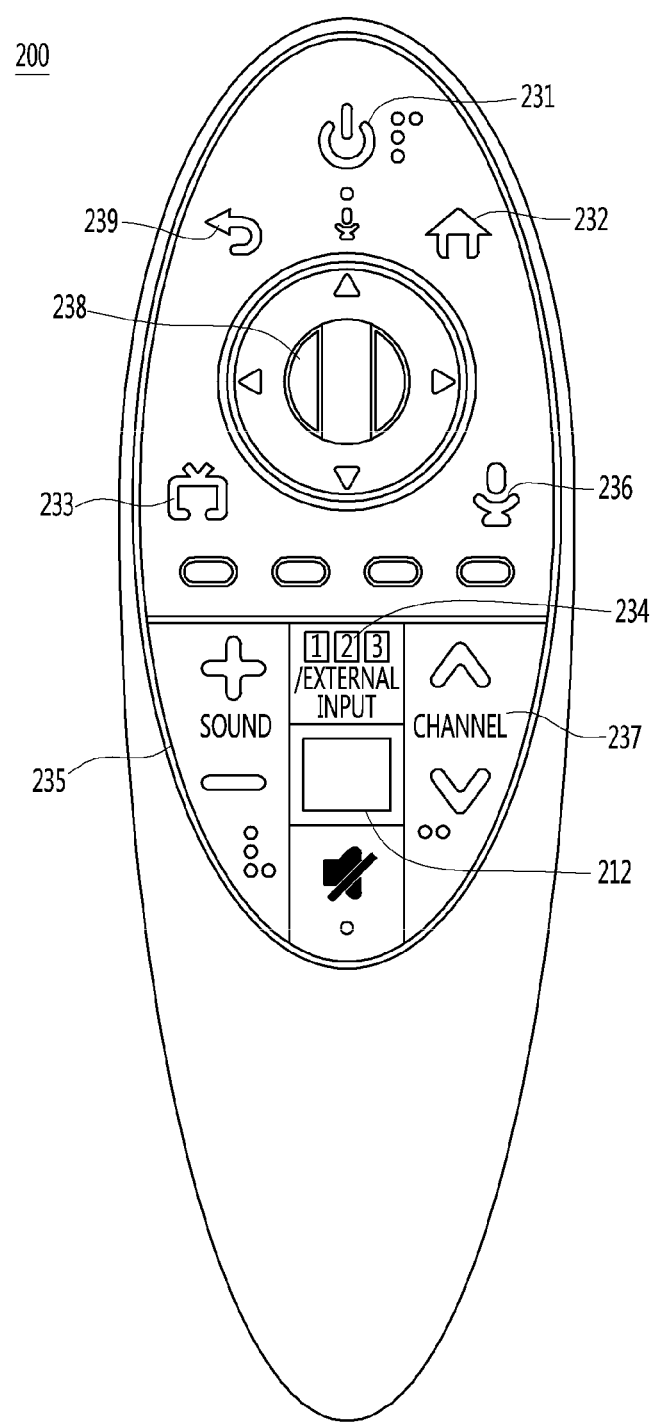
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information about a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice. The sound acquisition unit 290 can include at least one microphone and obtain voice through the microphone.

Figure 4:
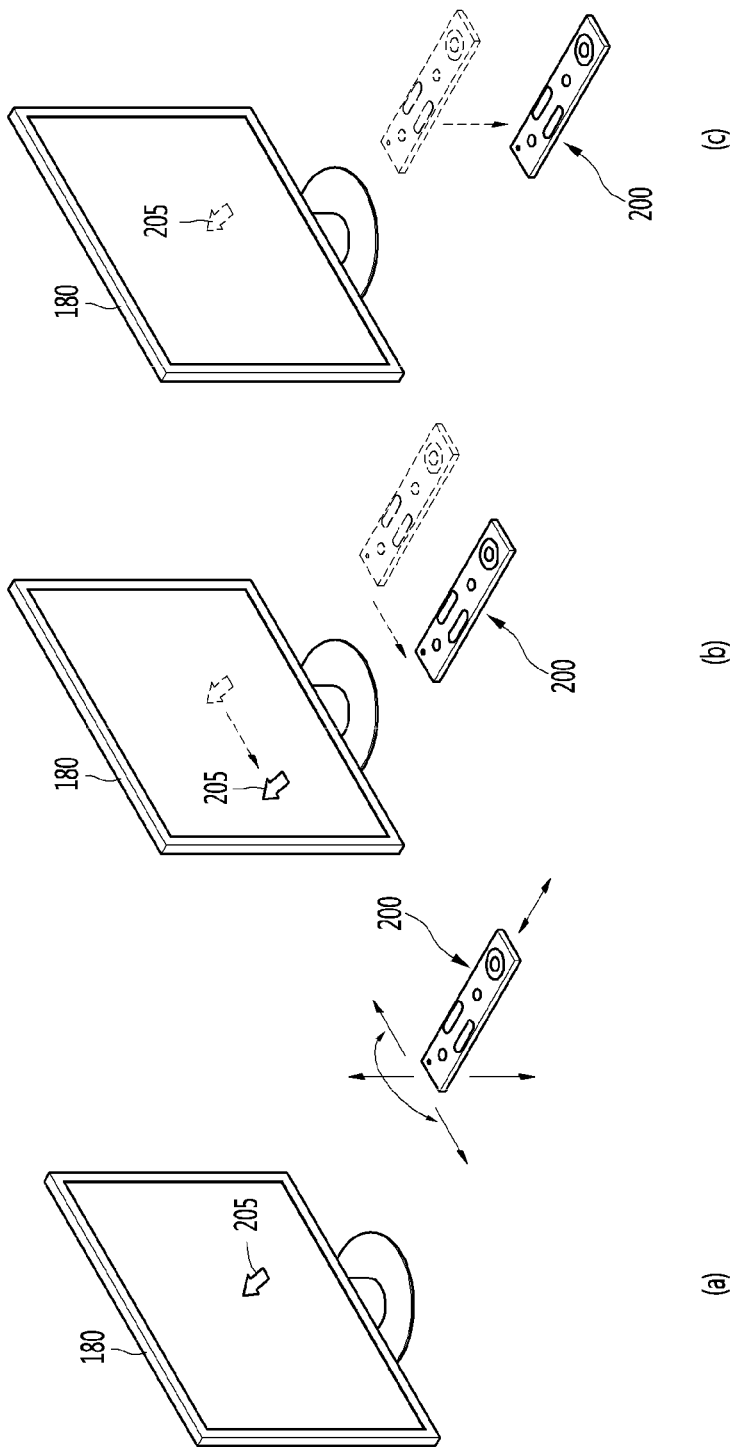
FIG. 4 is a view of utilizing a remote control device according to an embodiment of the present invention.

FIG. 4 is a view of utilizing a remote control device according to an embodiment of the present invention. FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
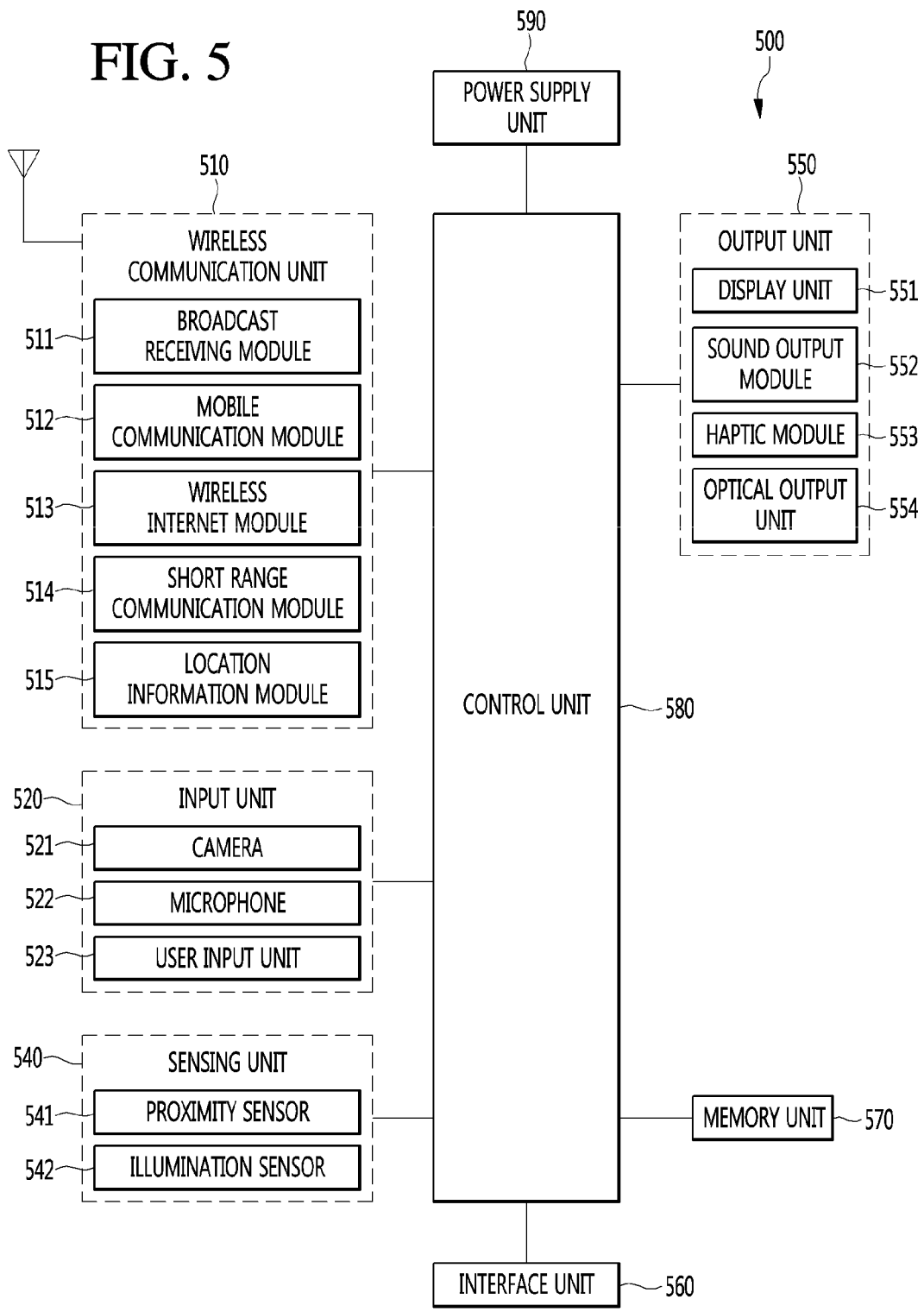
FIG. 5 is a block diagram illustrating a mobile terminal according to an embodiment of the present invention.

Then, a configuration of a mobile terminal according to an embodiment of the present invention will be described with reference to FIG. 5. FIG. 5 is a block diagram illustrating a mobile terminal according to an embodiment of the present invention.

The mobile terminal 500 can include a wireless communication unit 510, an input unit 520, a sensing unit 540, an output unit 550, an interface unit 560, a memory unit 570, a control unit 580, and a power supply unit 590. In implementing a mobile terminal, all components shown in FIG. 5 may not be necessary, so that a mobile terminal described in this specification can include components less or more than the components listed above.

In more detail, the wireless communication unit 510 in the components can include at least one module allowing wireless communication between the mobile terminal 500 and a wireless communication system, between the mobile terminal 500 and another mobile terminal 500, or between the mobile terminal 500 and an external server. Additionally, the wireless communication unit 510 can include at least one module connecting the mobile terminal 500 to at least one network.

The wireless communication unit 510 can include at least one of a broadcast receiving module 511, a mobile communication module 512, a wireless Internet module 513, a short-range communication module 514, and a location information module 515.

The input unit 520 can include a camera 521 or an image input unit for image signal input, a microphone 522 or an audio input unit for receiving audio signal input, and a user input unit 523 (for example, a touch key and a mechanical key) for receiving information from a user. Voice data or image data collected by the input unit 520 are analyzed and processed as a user's control command.

The sensing unit 540 can include at least one sensor for sensing at least one of information in a mobile terminal, environmental information around a mobile terminal, and user information. For example, the sensing unit 540 can include at least one of a proximity sensor 541, an illumination sensor 542, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 521), a microphone (for example, the microphone 522), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification can combine information sensed by at least two or more sensors among such sensors and utilize it.

The output unit 550 is used to generate a visual, auditory, or haptic output and can include at least one of a display unit 551, a sound output module 552, a haptic module 553, and an optical output unit 554. The display unit 551 can be formed with a mutual layer structure with a touch sensor or formed integrally, so that a touch screen can be implemented. Such a touch screen can serve as the user input unit 523 providing an input interface between the mobile terminal 500 and a user and an output interface between the mobile terminal 500 and a user at the same time.

The interface unit 560 can serve as a path to various kinds of external devices connected to the mobile terminal 500. The interface unit 560 can include at least one of a wired/wireless headset port, an external charger port, a wired/wireless data port, a memory card port, a port connecting a device equipped with an identification module, an audio Input/Output (I/O) port, a video I/O port, or an earphone port. When an external device is connected to the interface unit 560, the mobile terminal 500 can perform an appropriate control relating to the connected external device.

Additionally, the memory unit 570 can store data supporting various functions of the mobile terminal 500. The memory unit 570 can store a plurality of application programs (for example, application programs or applications) running on the mobile terminal 500 and also data and commands for operations of the mobile terminal 500. At least part of such an application program can be downloaded from an external server through wireless communication. Additionally, at least part of such an application program can be included in the mobile terminal 500 from the time of shipment in order to perform a basic function (for example, an incoming call, a transmission function, and a message reception) of the mobile terminal 500. Moreover, an application program can be stored in the memory unit 570 and installed on the mobile terminal 500, so that it can run to perform an operation (or a function) of the mobile terminal 500 by the control unit 580.

The control unit 580 can control overall operations of the mobile terminal 500 generally besides an operation relating to the application program. The control unit 580 can provide appropriate information or functions to a user or process them by processing signals, data, and information input/output through the above components or executing application programs stored in the memory unit 570.

Additionally, in order to execute an application program stored in the memory unit 570, the control unit 580 can control at least part of the components shown in FIG. 5. Furthermore, in order to execute the application program, the control unit 580 can combine at least two of the components in the mobile terminal 500 and operate it.

The power supply unit 590 can receive external power or internal power under a control of the control unit 580 and supply power to each component in the mobile terminal 500. The power supply unit 590 includes a battery and the battery can be a built-in battery or a replaceable battery.

At least part of each component can operate cooperatively in order to implement operations, controls, or control methods of the mobile terminal 500 according to various embodiments of the present invention described below. Additionally, the operations, controls, or control methods of the mobile terminal 500 can be implemented on the mobile terminal 500 by executing at least one application program stored in the memory unit 570.

Hereinafter, prior to examining various embodiments implemented through the mobile terminal 500, the above-listed components are described in more detail with reference to FIG. 5.

First, in describing the wireless communication unit 510, the broadcast receiving module 510 of the wireless communication unit 511 can receive a broadcast signal and/or broadcast related information from an external broadcast management server through a broadcast channel. The broadcast channel can include a satellite channel and a terrestrial channel. At least two broadcast receiving modules for simultaneous broadcast reception for at least two broadcast channels or broadcast channel switching can be provided to the mobile terminal 100.

The mobile communication module 512 can transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal can include various types of data according to a voice call signal, a video call signal, or text/multimedia message transmission.

The wireless Internet module 513 refers to a module for wireless Internet access and can be built in or external to the mobile terminal 500. The wireless Internet module 513 can be configured to transmit/receive a wireless signal in a communication network according to wireless internet technologies.

The wireless Internet technology can include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless Internet module 513 transmits/receives data according to at least one wireless Internet technology including any Internet technologies not listed above.

From the viewpoint that wireless Internet access by WiBro, HSDPA, HSUPA, GSM, CDMA, WCDMA, LTE, and LTE-A is achieved through a mobile communication network, the wireless Internet module 513 performing wireless Internet access through the mobile communication network can be understood as one type of the mobile communication module 512.

The short-range communication module 514 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 514 can support wireless communication between the mobile terminal 500 and a wireless communication system, between the mobile terminal 500 and another mobile terminal 500, or between networks including the mobile terminal 500 and another mobile terminal 500 (or an external server) through wireless area networks. The wireless area networks can be wireless personal area networks.

Here, the other mobile terminal 500 can be a wearable device (for example, a smart watch, a smart glass, and an HMD) that is capable of exchanging data (or interworking) with the mobile terminal 500. The short-range communication module 514 can detect (or recognize) a wearable device around the mobile terminal 500, which is capable of communicating with the mobile terminal 500. Furthermore, if the detected wearable device is a device authenticated to communicate with the mobile terminal 500, the control unit 580 can transmit at least part of data processed in the mobile terminal 500 to the wearable device through the short-range communication module 514. Accordingly, a user of the wearable device can use the data processed in the mobile terminal 500 through the wearable device. For example, according thereto, if a call is received by the mobile terminal 500, a user can perform a phone call through the wearable device or if a message is received by the mobile terminal 500, a user can check the received message.

The location information module 515 is a module for obtaining the location (or the current location) of a mobile terminal and its representative examples include a global positioning system (GPS) module or a Wi-Fi module. For example, the mobile terminal 500 can obtain its position by using a signal transmitted from a GPS satellite through the GPS module. As another example, the mobile terminal 500 can obtain its position on the basis of information of a wireless access point (AP) transmitting/receiving a wireless signal to/from the Wi-Fi module, through the Wi-Fi module. If necessary, the position information module 115 can perform a function of another module in the wireless communication unit 510 in order to obtain data on the location of the mobile terminal substitutionally or additionally. The location information module 515 is a module for obtaining the position (or the current position) of the mobile terminal and is not limited to a module directly calculating and obtaining the position of the mobile terminal.

Then, the input unit 520 is used for inputting image information (or signal), audio information (or signal), data, or information inputted from a user and the mobile terminal 500 can include at least one camera 521 in order for inputting image information. The camera 521 processes image frames such as a still image or a video obtained by an image sensor in a video call mode or a capturing mode. The processed image frame can be displayed on the display unit 551 or stored in the memory unit 570. Moreover, a plurality of cameras 521 equipped in the mobile terminal 500 can be arranged in a matrix structure and through the camera 521 having such a matrix structure, a plurality of image information having various angles or focuses can be input to the input terminal 500. Additionally, the plurality of cameras 521 can be arranged in a stereo structure to obtain the left and right images for implementing a three-dimensional image.

The microphone 522 processes external sound signals as electrical voice data. The processed voice data can be utilized variously according to a function (or an application program being executed) being performed in the mobile terminal 500. Moreover, various noise canceling algorithms for removing noise occurring during the reception of external sound signals can be implemented in the microphone 522.

The user input unit 523 is to receive information from a user and if information is input through the user input unit 523, the control unit 580 can control an operation of the mobile terminal 500 according to the input information. The user input unit 523 can include a mechanical input means (or a mechanical key, for example, a button, a dome switch, a jog wheel, and a jog switch at the front, back or side of the mobile terminal 500) and a touch type input means. As one example, a touch type input means can include a virtual key, a soft key, or a visual key, which is displayed on a touch screen through software processing or can include a touch key disposed at a portion other than the touch screen. Moreover, the virtual key or visual key can have various forms and can be disposed on a touch screen and for example, can include graphic, text, icon, video, or a combination thereof.

Moreover, the sensing unit 540 can sense at least one of information in a mobile terminal, environmental information around a mobile terminal, and user information and can then generate a sensing signal corresponding thereto. On the basis of such a sensing signal, the control unit 580 can control the drive or control of the mobile terminal 500 or can perform data processing, functions, or operations relating to an application program installed in the mobile terminal 500. Representative sensors among various sensors included in the sensing unit 540 will be described in more detail.

First, the proximity sensor 541 refers to a sensor detecting whether there is an object approaching a predetermined detection surface or whether there is an object around by using the strength of an electromagnetic field or infrared, without mechanical contact. The proximity sensor 541 can disposed in an inner area of a mobile terminal surrounded by the touch screen or around the touch screen.

Examples of the proximity sensor 541 can include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 541 can be configured to detect the proximity of an object by changes in an electric field according to the proximity of the object having conductivity. In this case, the touch screen (or a touch sensor) itself can be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch." A position that an object is proximity-touched on the touch screen is a position that the object vertically corresponds to the touch screen if the object is proximity-touched. The proximity sensor 541 can detect a proximity touch and a proximity touch pattern (for example, a proximity touch distance, a proximity touch direction, a proximity touch speed, a proximity touch time, a proximity touch position, and a proximity touch movement state). Moreover, the control unit 580 processes data (for information) corresponding to a proximity touch operation and a proximity touch pattern, detected through the proximity sensor 541, and furthermore, can output visual information corresponding to the processed data on the touch screen. Furthermore, according to whether a touch for the same point on the touch screen is a proximity touch or a contact touch, the control unit 580 can control the mobile terminal 500 to process different operations or data (or information).

The touch sensor detects a touch (or a touch input) applied to the touch screen (or the display unit 551) by using at least one of various touch methods, for example, a resistive film method, a capacitive method, an infrared method, an ultrasonic method, and a magnetic field method.

For example, the touch sensor can be configured to convert a pressure applied to a specific portion of the touch screen or changes in capacitance occurring at a specific portion into electrical input signals. The touch sensor can be configured to detect a position and area that a touch target applying a touch on the touch screen touches the touch sensor, a pressured if touched, and a capacitance if touched. Here, the touch target, as an object applying a touch on the touch sensor, can be a finger, a touch pen, a stylus pen, or a pointer, for example.

In such a manner, if there is a touch input on the touch sensor, signal(s) corresponding thereto are sent to a touch controller. The touch controller processes the signal(s) and then transmits corresponding data to the control unit 580. Therefore, the control unit 580 can recognize which area of the display unit 551 is touched. Herein, the touch controller can be an additional component separated from the control unit 580 or can be the control unit 580 itself.

Moreover, the control unit 580 can perform different controls or the same control according to types of a touch target touching the touch screen (or a touch key equipped separated from the touch screen). Whether to perform different controls or the same control according to types of a touch target can be determined according to a current operation state of the mobile terminal 500 or an application program in execution.

Moreover, the above-mentioned touch sensor and proximity sensor are provided separately or combined and can thus sense various types of touches, for example, short (or tap) touch), long touch, multi touch, drag touch, flick touch, pinch-in touch, pinch-out touch, swipe touch, and hovering touch for the touch screen.

The ultrasonic sensor can recognize position information of a detection target by using ultrasonic waves. Moreover, the control unit 580 can calculate the position of a wave source through information detected by an optical sensor and a plurality of ultrasonic sensors. The position of the wave source can be calculated by using the property that light is much faster than ultrasonic wave, that is, a time that light reaches an optical signal is much shorter than a time that ultrasonic wave reaches an ultrasonic sensor. In more detail, the position of the wave source can be calculated by using a time difference with a time that ultrasonic wave reaches by using light as a reference signal.

Moreover, the camera 521 described as a configuration of the input unit 520 can include at least one of a camera sensor (for example, CCD and CMOS), a photo sensor (or an image sensor), or a laser sensor.

The camera 521 and the laser sensor can be combined to detect a touch of a detection target for a three-dimensional image. The photo sensor can be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor can calculate the coordinates of a detection target according to the amount of change in light and through this, can obtain the position information of the detection target.

The display unit 551 can display (output) information processed in the mobile terminal 500. For example, the display unit 551 can display execution screen information of an application program running on the mobile terminal 500 or user interface (UI) and graphic user interface (GUI) information according to such execution screen information.

Additionally, the display unit 551 can be configured as a three-dimensional display unit displaying a three-dimensional image.

A three-dimensional display method, for example, a stereoscopic method (a glasses method), an autostereoscopic (no glasses method), a projection method (a holographic method) can be applied to the three-dimensional display unit The sound output unit 552 can output audio data received from the wireless communication unit 510 or stored in the memory unit 570 in a call signal reception or call mode, a recording mode, a voice recognition mode, or a broadcast reception mode. The sound output unit 552 can output a sound signal relating to a function (for example, a call signal reception sound and a message reception sound) performed by the mobile terminal 500. The sound output unit 552 can include a receiver, a speaker, and a buzzer.

The haptic module 553 generates various haptic effects that a user can feel. A representative example of a haptic effect that the haptic module 553 generates is vibration. The intensity and pattern of vibration generated by the haptic module 553 can be controlled by a user's selection or a setting of a control unit. For example, the haptic module 553 can synthesize and output different vibrations or output different vibrations sequentially.

The haptic module 553 can generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 553 can be implemented to deliver a haptic effect through a direct contact and also allow a user to feel a haptic effect through a muscle sense such as a finger or an arm. The haptic module 553 can be more than two according to a configuration aspect of the mobile terminal 500.

The optical output unit 554 outputs a signal for notifying event occurrence by using light of a light source of the mobile terminal 500. An example of an event occurring in the mobile terminal 500 includes message reception, call signal reception, missed calls, alarm, schedule notification, e-mail reception, and information reception through an application.

A signal output from the optical output unit 554 is implemented as a mobile terminal emits single color of multi-color to the front or the back. The signal output can be terminated if a mobile terminal detects user's event confirmation.

The interface unit 560 can serve as a path to all external devices connected to the mobile terminal 500. The interface unit 560 can receive data from an external device, receive power and deliver it to each component in the mobile terminal 500, or transmit data in the mobile terminal 500 to an external device. For example, the interface unit 560 can include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 500, can include a user identity module (UIM), a subscriber identity module (SIM), and a universal subscriber identity module (USIM). A device equipped with an identification module (hereinafter referred to as an identification device) can be manufactured in a smart card form. Accordingly, the identification device can be connected to the terminal 500 through the interface unit 560.

Additionally, if the mobile terminal 500 is connected to an external cradle, the interface unit 560 can become a path through which power of the cradle is supplied to the mobile terminal 500 or a path through which various command signals inputted from the cradle are delivered to the mobile terminal 500 by a user. The various command signals or the power input from the cradle can operate as a signal for recognizing that the mobile terminal 500 is accurately mounted on the cradle.

The memory unit 570 can store a program for an operation of the control unit 580 and can temporarily store input/output data (for example, a phone book, a message, a still image, and a video). The memory unit 570 can store data on various patterns of vibrations and sounds outputted during a touch input on the touch screen.

The memory unit 570 can include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 500 can operate in relation to a web storage performing a storage function of the memory unit 570 on Internet.

Moreover, as mentioned above, the control unit 580 can control operations relating to an application program and overall operations of the mobile terminal 500 in general. For example, if a state of the mobile terminal 500 satisfies set conditions, the control unit 580 can execute or release a lock state limiting an output of a control command of a user for applications.

Additionally, the control unit 580 can perform a control or processing relating to a voice call, data communication, and a video call can perform pattern recognition processing for recognizing handwriting input or drawing input on the touch screen as a text and an image, respectively. Furthermore, the control unit 580 can use at least one or a combination of the above components to perform a control in order to implement various embodiments described below on the mobile terminal 500.

The power supply unit 590 can receive external power or internal power under a control of the control unit 580 and can then supply power necessary for an operation of each component. The power supply unit 590 includes a battery. The battery is a rechargeable built-in battery and can be detachably coupled to a terminal body in order for charging.

Additionally, the power supply unit 590 can include a connection port and the connection port can be configured as one example of the interface unit 560 to which an external charger supplying power for charging of the battery is electrically connected.

As another example, the power supply unit 590 can be configured to charge a battery through a wireless method without using the connection port. In this case, the power supply unit 590 can receive power from an external wireless power transmission device through at least one of an inductive coupling method based on a magnetic induction phenomenon, and a magnetic resonance coupling method based on an electromagnetic resonance phenomenon.

Moreover, various embodiments below can be implemented in a computer or device similar thereto readable medium by using software, hardware, or a combination thereof.

Then, a communication system using the mobile terminal 500 is described according to an embodiment of the present invention.

First, the communication system can use different wireless interfaces and/or physical layers. For example, a wireless interface available to the communication system can include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is made limited to CDMA. However, it is apparent that the present invention is applicable to all communication systems including Orthogonal Frequency Division Multiplexing (OFDM) wireless communication systems in addition to CDMA wireless communication systems.

The CDMA wireless communication system can include at least one terminal 100, at least one base station (BS) (it can be referred to as Node B or Evolved Node B), at least one base station controllers (BSCs), and a mobile switching center (MSC). MSC can be configured to be connected to Public Switched Telephone Network (PSTN) and BSCs. BSCs can be connected being paired with a BS through a backhaul line. The backhaul line can be provided according to at least one of E1/T1, ATM, IP, PPP, Frame Relay, HDSL, ADSL, and xDSL. Accordingly, a plurality of BSCs can be included in a CDMA wireless communication system.

Each of a plurality of BSs can include at least one sensor and each sensor can include an omni-directional antenna or an antenna indicating a specific radial direction from a BS. Additionally, each sensor can include at least two antennas in various forms. Each BS can be configured to support a plurality of frequency allocations and each of the plurality of frequency allocations can have a specific spectrum (for example, 1.25 MHz, 5 MHz, and so on).

The intersection of a sector and a frequency allocation can be referred to as a CDMA channel. A BS can be referred to as a Base Station Transceiver Subsystem (BTS). In such a case, one BSC and at least one BS together can be referred to as "BS". A BS can also represent "cell site". Additionally, each of a plurality of sectors for a specific BS can be referred to as a plurality of cell sites.

A Broadcasting Transmitter (BT) transmits broadcast signals to the terminals 500 operating in a system. The broadcast receiving module 511 shown in FIG. 5 is provided in the terminal 500 for receiving broadcast signals transmitted from the BT.

Additionally, GPS can be linked to a CDMA wireless communication system in order to check the location of the mobile terminal 500. Then, a satellite helps obtaining the location of the mobile terminal 500. Useful location information can be obtained by at least one satellite. Herein, the location of the mobile terminal 500 can be traced by using all techniques for tracing the location in addition to GPS tracking technique. Additionally, at least one GPS satellite can be responsible for satellite DMB transmission selectively or additionally.

The location information module 515 in the mobile terminal 500 is for detecting and calculating the position of the mobile terminal and its representative example can include a GPS module and a WiFi module. If necessary, the location information module 515 can perform a function of another module in the wireless communication unit 510 in order to obtain data on the location of the mobile terminal substitutionally or additionally.

The location information module 115 such as a GPS module can calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 515 can speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) can be utilized.

WPS is a technique for tracking the location of the mobile terminal 500 by using a WiFi module in the mobile terminal 500 and a wireless Access Point (AP) for transmitting or receiving wireless signals to or from the WiFi module and can mean a Wireless Local Area Network (WLAN) based location measurement technique using WiFi.

A WiFi location tracking system can include a WiFi location measurement server, a mobile terminal 500, a wireless AP connected to the mobile terminal 500, and a database for storing arbitrary wireless AP information.

The mobile terminal 500 in access to a wireless AP can transmit a location information request message to a WiFi location measurement server.

The WiFi location measurement server extracts information of a wireless AP connected to the mobile terminal 500 on the basis of a location information request message (or signal) of the mobile terminal 500. Information of a wireless AP connected to the mobile terminal 500 can be transmitted to the WiFi location measurement server through the mobile terminal 500 or can be transmitted from a wireless AP to a WiFi location measurement server.

Based on the location information request message of the mobile terminal 500, the extracted information of a wireless AP can be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, and Noise Strength.

As mentioned above, the WiFi position measurement server can extract wireless AP information corresponding to a wireless AP that the mobile terminal 500 access from a pre-established database by using information of the wireless AP connected to the mobile terminal 100. At this point, information of arbitrary wireless APs stored in the database can information such as MAC Address, SSID, channel information, Privacy, Network Type, latitude and longitude coordinates of a wireless AP, a building name where a wireless AP is located, the number of floors, indoor detailed location (GPS coordinates available), the address of the owner of an AP, and phone numbers. At this point, in order to remove a mobile AP or a wireless AP provided using illegal MAC address during a measurement process, a WiFi location measurement server can extract only a predetermined number of wireless AP information in high RSSI order.

Then, the WiFi location measurement server can extract (or analyze) the location information of the mobile terminal 500 by using at least one wireless AP information extracted from the database. By comparing the included information and the received wireless AP information, location information of the mobile terminal 500 is extracted (or analyzed).

As a method of extracting (or analyzing) the location information of the motile terminal 500, a Cell-ID method, a finger-print method, a triangulation method, and a landmark method can be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but if the installation density of wireless APs is low, measurement precision is poor.

The finger-print method is a method for collecting signal intensity information by selecting a reference location from a service area and estimating the location through signal intensity information transmitted from a mobile terminal on the basis of the collected information. In order to use the finger-print method, there is a need to provide a database for storing propagation characteristics in advance.

The triangulation method is a method for calculating the location of a mobile terminal on the basis of a distance between coordinates of at least three wireless APs and a mobile terminal. In order to measure a distance between a mobile terminal and a wireless AP, a signal intensity converted into distance information, Time of Arrival (ToA), Time Difference of Arrival (TDoA), and Angle of Arrival (AoA) can be used.

The landmark method is a method for measuring the location of a mobile terminal by using a landmark transmitter knowing the location.

In addition to the listed methods, a variety of algorithms can be utilized as methods for extracting (or analyzing) the location information of a mobile terminal.

As the extracted location information of the mobile terminal 500 is transmitted to the mobile terminal 500 through the WiFi location measurement server, the mobile terminal 500 can obtain the location information.

As connected to at least one wireless AP, the mobile terminal 500 can obtain location information. At this point, the number of wireless APs, which are required for obtaining the location information of the mobile terminal 500, can vary according to a wireless communication environment where the mobile terminal 500 is located.

Figure 6:
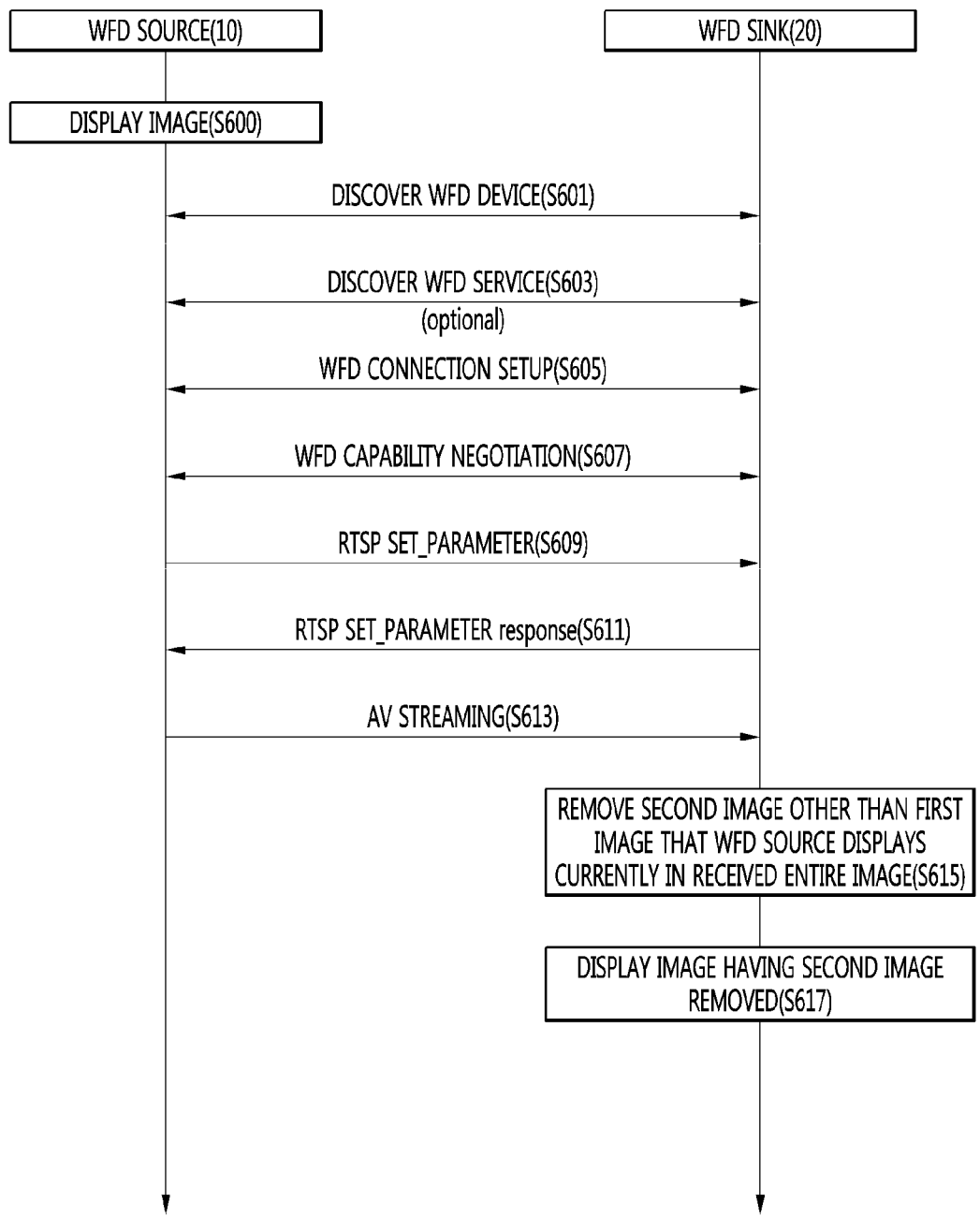
FIG. 6 is a ladder diagram illustrating a process that a WFD session is established between a WFD source and a WFD sink and screen sharing service is provided according to an embodiment of the present invention.

Then, referring to FIG. 6, an example that a WFD session is established between a WFD source and a WFD sink and screen sharing service is provided is described. FIG. 6 is a ladder diagram illustrating a process that a WFD session is established between a WFD source and a WFD sink and a screen sharing service is provided according to an embodiment of the present invention.

At least one of operations shown in FIG. 6 can be supported by one or more Wi-Fi Direct standard documents.

A display service in WFDS can mean service and application for allowing screen sharing between P2P devices. P2P service using display service can be referred to as a WFD device; a device for supporting streaming of multimedia content through a device P2P link among WFD devices can be referred to as a WFD source; and a device for receiving multimedia content from a WFD source device through a P2P link and rendering it can be referred to as a WFD sink.

The WFD source 10 can be the mobile terminal 500 shown in FIG. 5. Accordingly, the WFD source 10 can include all the components of the mobile terminal 500 shown in FIG. 5.

The WFD sink 20 can be the display device 100 shown in FIG. 1. Accordingly, the WFD sink 20 can include all the components of the mobile terminal 500 shown in FIG. 1.

Referring to FIG. 6, the WFD source 10 can display an image on a screen in operation S600.

According to an embodiment, an image displayed on a screen can be an image of multimedia content.

According to another embodiment, if the WFD source 10 is the mobile terminal 500 shown in FIG. 5, an image displayed on the screen can be an image being displayed by the mobile terminal 500, for example, the home screen of the mobile terminal 500 or the execution screen of an application installed on the mobile terminal 500 or a video of a media content.

Then, the WFD source 10 and the WFD sink 20 can first discover the presence of each other before a WFD connection setup through WFD device discovery (S601). In more detail, WFD devices can recognize the presence of each other through a probe request frame including WFD information element (IE) and a probe reply frame. The WFD IE can include base information for establishing an optimized connection between WFD devices, for example, a device type and a device state. If a WFD device receives a probe request frame including a WFD IE, in response to this, the WFD device can transmit a probe reply frame including its WFD IE. If a WFD device is linked to an AP and operates as a Wi-Fi P2P device, more than two Wi-Fi transceivers operate logically in one physical device. At this pint, in order for WFD device discovery, a Wi-Fi Direct transceiver is used. A probe request frame for WFD device discovery can include a P2P IE in addition to a WFD IE and they can be decoded by a Wi-Fi Direct transceiver.

Then, the WFD source 10 and the WFD sink 20 can discover the service capability of each other before a WFD connection setup (S603). In more detail, if one WFD device transmits a service discovery request frame where WFD capability is included as information sub element, in response to this, another WFD device can transmit a service discovery reply frame where its WFD capability is included as an information sub element. In relation to a service discovery procedure, a WFD device for supporting a service discovery procedure as a selective procedure can perform a service discovery procedure with a discovered WFD device for supporting a service discovery procedure. In order to perform a service discovery procedure, a probe request frame and reply frame used for a device discovery procedure can include information for indicating whether a WFD device has a capability for supporting a service discovery procedure.

Then, the WFD source 10 or the WFD sink 20 can select a peer WFD device for a WFD connection setup. A peer WFD device for processing a WFD connection setup can be selected by a user's input or a peer WFD device for processing a WFD connection setup can be automatically selected according to a policy.

Then, the WFD device can select a method for a WFD connection setup with the selected peer WFD device in operation S605. In more detail, a WFD device can establish a WFD connection through a Connectivity Scheme of one of Wi-Fi P2P and Tunneled Direct Link Setup (TDLS). The WFD devices can determine a Connectivity Scheme based on Preferred Connectivity information and a linked BSSID sub element delivered in addition to a WFD IE.

If a WFD setup is performed successfully by using Wi-Fi P2P or TDLS between WFD devices, a WFD device can process WFD capability negotiation in operation S607. In more detail, the WFD source 10 and the WFD sink 20 can exchange a message by using the Real-Time Streaming Protocol (RTSP) to determine a parameter set for defining an audio/video payload during a WFD session. The WFD source 10 and the WFD sink 20 can exchange their specification information. The WFD source 10 can inquire the capability of the WFD sink 20 by using the RTSP protocol and in response to this, the WFD sink 20 can transmit its capability information to the WFD source 10. For example, the WFD sink 20 can transmit resolution information including its supportable resolutions to the WFD source 10. For example, the WFD sink 20 can transmit resolution information that its supportable resolution includes a resolution corresponding to a 16:9 or 4:3 aspect ratio to the WFD source 10. Herein, a resolution corresponding to 16:9 or 4:3 is just one example, and can be a resolution corresponding to an aspect ratio that a horizontal length is longer than a vertical length.

On the other hand, the WFD source 10 can also transmit resolution information including its supportable resolutions to the WFD sink 20.

FIGS. 7A to 7C are views illustrating resolution information that a WFD sink transmits to a WFD source according to an embodiment of the present invention.

The WFD sink 20 can transmit at least one of resolution tables shown in FIGS. 7A to 7C to the WFD source 10. That is, the WFD sink 20 can transmit a resolution corresponding to a 16:9 or 4:3 aspect ratio and a resolution corresponding to an aspect ratio that a horizontal length is longer than a vertical length to the WFD source 10.

The resolution table shown in FIG. 7A can be a table for representing a set of resolutions supported by a handheld device that a WFD device supports and a refresh rate corresponding to a resolution.

The resolution table shown in FIG. 7B can be a table for representing a set of Consumer Electronics Association (CEA) resolutions supported by a WFD device and a refresh rate corresponding to a resolution.

The resolution table shown in FIG. 7C can be a table for representing a set of Video Electronics Standards Association (VESA) resolutions supported by a WFD device and a refresh rate corresponding to a resolution.

FIG. 7D is a view illustrating a message that a WFD source inquires the capability of a WFD sink and a WFD sink includes its capability information in correspondence thereto.

After performing a connection setup with the WFD sink 20, the WFD source 10 can transmit a request message M3 for inquiring the capability of the WFD sink 20 by using the RTSP protocol. Referring to FIG. 7D, the WFD source 10 can transmit a request message including a wfd-video-formats parameter 730 to the WFD sink 20. The wfd-video-formats parameter 730 can be a parameter that the WFD sink 20 inquires a supportable video resolution. In response to the request message received from the WFD source 10, the WFD sink 20 can transmit a request message M3 including the resolution information shown in FIGS. 7A to 7C to the WFD source 10. The resolution information can include resolution tables shown in FIGS. 7A to 7C. This can be checked through a value of the video format parameter 730 in the replay message.

Again, FIG. 6 is described.

During a WFD capability negotiation process with the WFD sink 20, the WFD source 10 can transmit a necessary request message to the WFD sink 20 by using the RTSP protocol. For example, the WFD source 10 can transmit, to the WFD sink 20 by using the RTSP protocol, a message including content that an image of a video content corresponding to a specific resolution is to be delivered based on resolution information received from the WFD sink 20. In more detail, the WFD source 10 can transmit, to the WFD sink 20 by using the RTSP protocol, a message including content that an image of a video content corresponding to a specific resolution is to be delivered based on resolution information received from the WFD sink 20. That is, the WFD source 10 can select one of a plurality of resolutions included in resolution information shown in FIGS. 7A to 7C, and transmit a message for representing that an image of the selected resolution is to be transmitted to the WFD sink 20. As described later, a resolution that the WFD source 10 selects can not correspond to the resolution of an image that the WFD source 10 displays currently.

The WFD sink 20 can transmit a reply message through the RTSP protocol on the basis of a request message received from the WFD source 10 in operation S611.

According to an embodiment of the present invention, a resolution that the WFD source 10 selects cannot be included in resolutions that the WFD source 10 supports. That is, a resolution that the WFD source 10 displays currently cannot be included in resolutions that the WFD sink 20 supports. Operation S609 and operation S611 can be included in operation S607 for WFD capability negotiation.

If the WFD capability negotiation operation is terminated successfully, a WFD session (or a Mira multicast session) is established between the WFD source 10 and the WFD sink 20, and audio and video contents can be streamed from the WFD source 10 to the WFD sink 20 in operation S613.

According to an embodiment, the entire images of a video content received from the WFD source 10 can include a first image that the WFD source 10 displays on a screen currently and a second image other than the first image. The second image can be an image that the WFD source 10 inserts because the output resolution of the WFD source 10 is not included in the supportable resolutions of the WFD sink 20. The output resolution can represent the resolution of the first image that the WFD source 10 displays. That is, the second image can be an image inserted to convert the resolution of the first image that the WFD source 10 displays currently into the supportable resolution of the WFD sink 20. The WFD source 10 can insert the second image into the first image in order to transmit an image fit for the aspect ratio of the WFD sink 20 and transmit it to the WFD sink 20.

According to an embodiment, the second image can be a black image. That is, the black image can be one of Letterbox, Pillarbox, and windowbox. The Letterbox can be a black image included at the top and bottom in order to match an image of a first aspect ratio to an image of a second aspect ratio. The Pillarbox can be a black image included at the left and right in order to match an image of a first aspect ratio to an image of a second aspect ratio. The windowbox can be a black image included at the top and bottom and the left and right in order to match an image of a first aspect ratio to an image of a second aspect ratio.

According to an embodiment of the present invention, it is assumed that the second image is a black image but the present invention is not limited thereto, and the second image can be a background image, a watch screen image, or an image having no information displayed and its form does not matter.

In the drawing, the WFD source 10 can be the mobile terminal 500 shown in FIG. 5 and the WFD sink 20 can be the display device 100 shown in FIG. 1, but this is just an example.

Figure 8C:
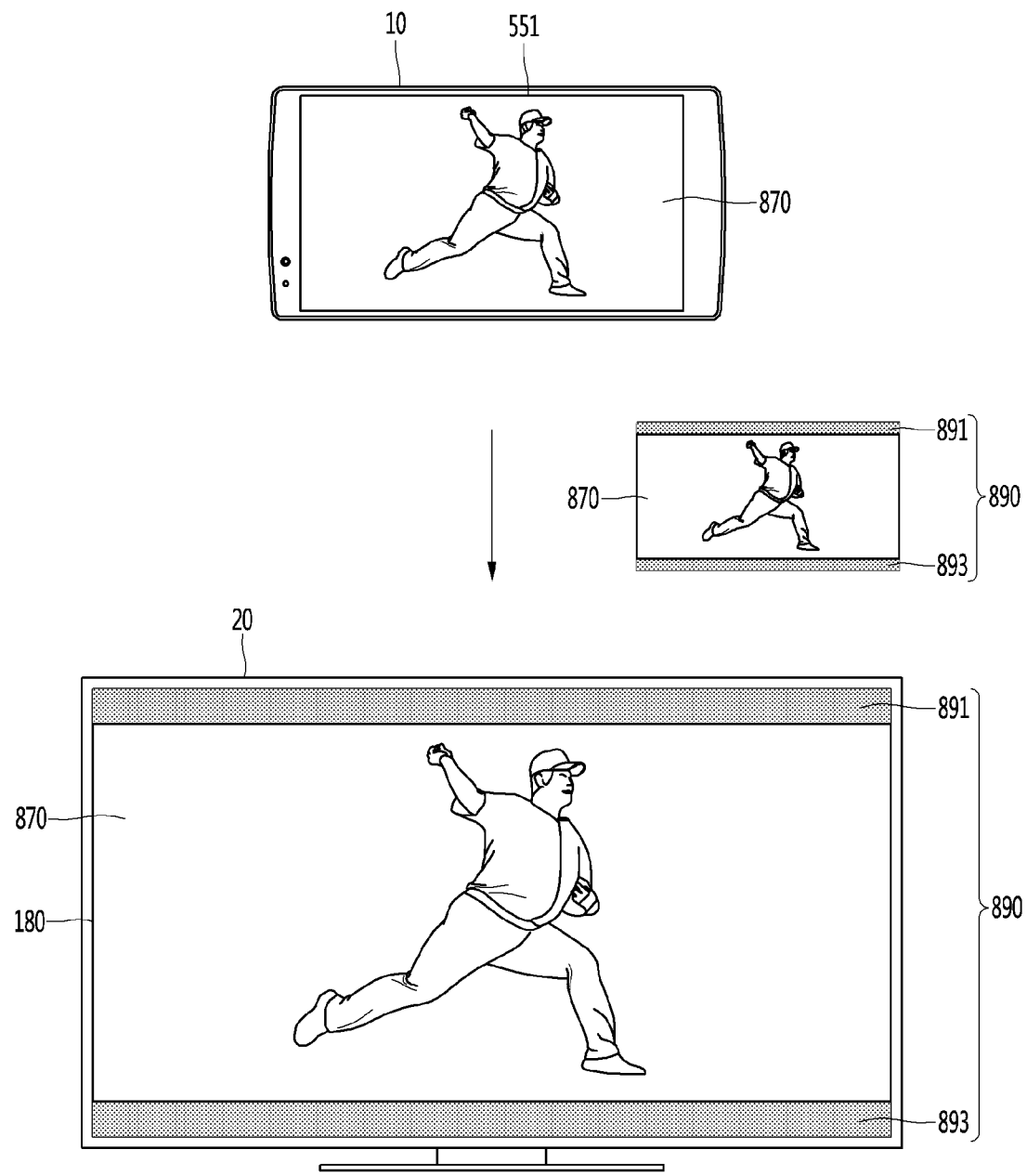
Figure 8D:
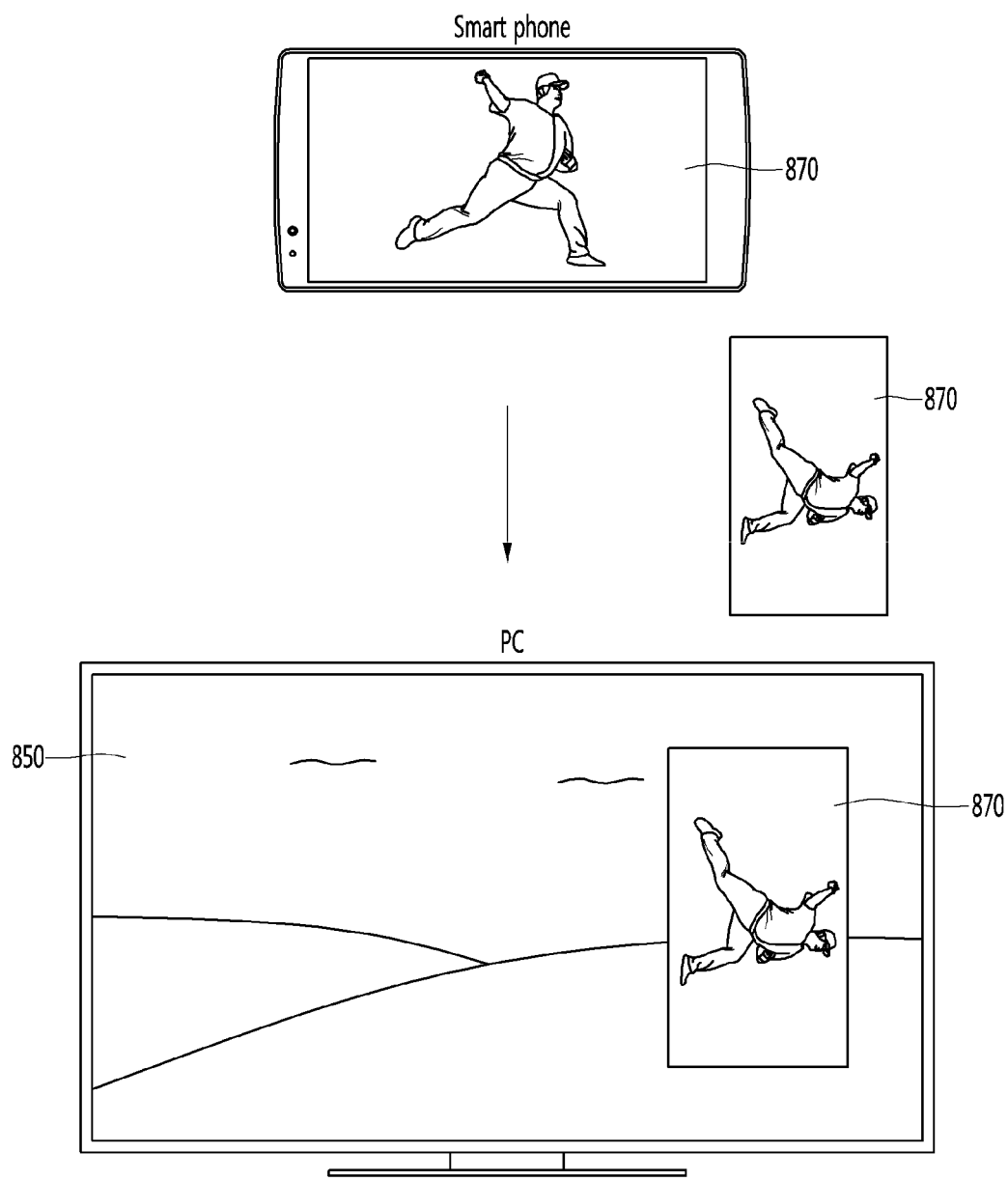
FIG. 8D is a view of sharing an image between a smartphone that does not follow Wi-Fi display standards and a PC.

FIGS. 8A to 8C are views that if display service for allowing a WFD source and a WFD sink to share a screen is provided, an image other than an image the WFD source displays currently is included and transmitted to the WFD sink. FIG. 8D is a view of sharing an image between a smartphone that does not follow Wi-Fi display standards and a PC.

Especially, FIGS. 8A and 8B are examples of performing a mirroring function while a first image 810 is played on a vertical screen through the WFD source 10 and FIG. 8C is an example of performing a mirroring function while the first image 810 is played on a horizontal screen through the WFD source 10. Displaying an image on a vertical screen by the WFD source 10 can represent displaying an image in a portrait mode. Additionally, displaying an image on a horizontal screen by the WFD source 10 can represent displaying an image in a landscape mode.

Referring to FIG. 8A, while displaying the first image 810 of a media content through the display unit 551, the WFD source 10 can transmit the image 810 of the media content to the WFD sink 20 through a screen sharing service. That is, the WFD source 10 and the WFD sink 20 can share a screen through operation S601 to operation S613, which are described with reference to FIG. 6. The WFD sink 20 can transmit resolution information including the resolution tables shown in FIGS. 7A to 7C to the WFD source 10 through a capability negotiation operation. The WFD source 10 can select a specific resolution on the basis of the received resolution information and transmit the first image 810 having the selected resolution to the WFD sink 20. For example, the WFD source 10 can transmit an image having a resolution corresponding to a 16:9 or 4:3 aspect ratio to the WFD sink 20. During this process, the WFD source 10 can include a second image 830 other than the first image 810 and transmit it to the WFD sink 20. The second image 830 can be an image included to transmit, to the WFD sink 20, the first image 810 having a resolution selected because a resolution selected by the WFD source 10 in operation S609 does not correspond to the output resolution of the WFD source 10. The resolution that the WFD source 10 selects can be a resolution corresponding to a 16:9 or 4:3 aspect ratio but is not limited thereto, and can be one of the plurality of resolutions shown in FIGS. 7A to 7C. As a result, the resolution of the first image 810 that the WFD source 10 displays cannot be included in resolutions that the WFD sink 20 supports. The WFD source 10 can include the second image 830 in the first image 810 to have a resolution corresponding to a 16:9 or 4:3 aspect ratio and transmit it.

The second image 830 can be a Pillarbox. That is, the second image 830 can include a left black image 831 and a right black image 833.

The WFD sink 20 can display the first image 810 and the second image 830 received from the WFD source 10 on the entire screen through the display unit 180.

Moreover, as shown in FIG. 8B, the WFD sink 20 can display the first image 810 and the second image 830 received from the WFD source 10 on a partial screen other than the entire screen of the display unit 180. That is, if receiving the first image 810 and the second image 830 from the WFD source 10 as displaying an image 850 of another media content, the WFD sink 20 can display the first image 810 and the second image 830 on a partial screen of the display unit 180.

A viewer can watch the first image 810 displayed on the screen of the WFD source 10 through the WFD sink 20 but feel uncomfortable to watch it due to the presence of the second image 830 that is a black image. Especially, if performing another task (for example, watching the image 850 of another media content) other than screen sharing service through the WFD sink 20, a user can be interrupted due to a black image.

Moreover, referring to FIG. 8C, the WFD source 10 can share the first image 870 with the WFD sink 20 in a state of being disposed in a horizontal screen. In FIG. 8C, the resolution that the WFD source 10 selects cannot be different from the output resolution of the WFD source 10. In more detail, an aspect ratio of the WFD source 10 disposed in a state that a horizontal length is longer than a vertical length can be different from an aspect ratio corresponding to the resolution that the WFD sink 20 supports. That is, a resolution corresponding to the aspect ratio of the WFD source 10 disposed in a state that a horizontal length is longer than a vertical length cannot be included in a resolution corresponding to an aspect ratio that the WFD sink 20 supports. The WFD source 10 can include the second image 890 other than the first image 870 and transmit it to the WFD sink 20 in order to match the first image 870 of a horizontal aspect ratio to an aspect ratio corresponding to the selected resolution.

In FIG. 8C, the second image 890 can be a letterbox. That is, the second image 890 can include a top black image 891 and a bottom black image 893.

The WFD sink 20 can display the first image 870 and the second image 890 received from the WFD source 10 on the entire screen through the display unit 180. In this case, a user can feel uncomfortable to watch the first image 870 due to the presence of the second image 890.

Accordingly, the WFD sink 20 can remove the black image other than an image that the WFD source 10 displays currently.

Moreover, in the case of FIG. 8D, if it does not follow Wi-Fi display standards, a case that a screen mirroring function between a smartphone and a PC is described. In this case, the smartphone can transmit the first image 870 to the PC. That is, only an image not including a black image can be transmitted. The smartphone can be disposed in a horizontal direction to transmit the first image 870 to the PC. However, if transmitting the first image 870 displayed in a horizontal direction to the PC, the smartphone can transmit the first image 870 in a vertical direction to the PC. Accordingly, the PC can display the first image 870 in a vertical direction on a screen. In order to watch the first image 870 in a horizontal direction, a user is required to perform an additional image rotation operation inconveniently.

Again, FIG. 6 is described.

The WFD sink 20 can remove a second image other than a first image that the WFD source 10 displays on a screen currently, from the entire image received from the WFD source 10 (S615). The entire image that the WFD sink 20 receives from the WFD source 10 can include a first image and a second image. The first image can be an image that the WFD source 10 displays on a screen currently. The second image can be an image inserted to adjust the first image that the WFD source 10 displays currently to an aspect ratio corresponding to a resolution that the WRD source 10 selects. The WFD sink 20 can extract the remaining second image other than the first image that the WFD source 10 displays currently, from the entire image received from the WFD source 10, and remove the extracted second image.

According to an embodiment, the WFD sink 20 can calculate a color standard deviation to extract a black image from the entire image received from the WFD source 10. In more detail, if a black image is a letterbox, the WFD sink 20 divides the entire image into a center area and top and bottom areas to calculate a color standard deviation in each area, and if a standard deviation of the center area is different by more than a predetermined value from that of the top and bottom areas, it is determined that a letterbox is inserted into the top and bottom areas. The WFD sink 20 can remove the inserted letterbox.

According to another embodiment, the WFD sink 20 can detect a black area through the edge detection of a frame. In more detail, by passing an I Frame of the entire image received from the WFD source 10 through a filter, an edge can be extracted and a letterbox can be detected based on the extracted edge.

According to another embodiment, the WFD sink 20 can extract a second image through a frame identifier. That is, the WFD sink 20 can extract the second image on the basis of the frame identifier of the first image and the frame identifier of the second image received from the WFD source 10. That is, the frame identifier of the first image that the WFD source 10 displays currently can be different from the frame identifier of the second image. The WFD sink 20 can extract the second image other than the first image by using a frame identifier.

As described above, a technique of extracting and removing a black image is just exemplary, and various known techniques can be used.

The WFD sink 20 can display the first image where the second image is removed in operation S617. According to an embodiment of the present invention, the WFD sink 20 can display the first image having the second image removed from the entire image received from the WRD source 10 on the entire screen of the display unit 180. That is, the WFD sink 20 can scale the first image to fit the aspect ratio of the display unit 151 and output it on the entire screen of the display unit 180.

According to another embodiment of the present invention, the WFD sink 20 can display the first image having the second image removed from the entire image received from the WRD source 10 on a partial screen of the display unit 180. For example, the WFD sink 20 can display only the first image having the second image removed from the entire image received from the WRD source 10 on a partial screen of the display unit 180. In this case, the first image can be displayed in a Picture In Picture (PIP) form.

Operation S617 will be described with reference to the drawings.

FIGS. 9A to 9D are views illustrating a process for displaying only an image that a WFD source displays in the entire image received from a WFD source according to an embodiment of the present invention.

Figure 9A:
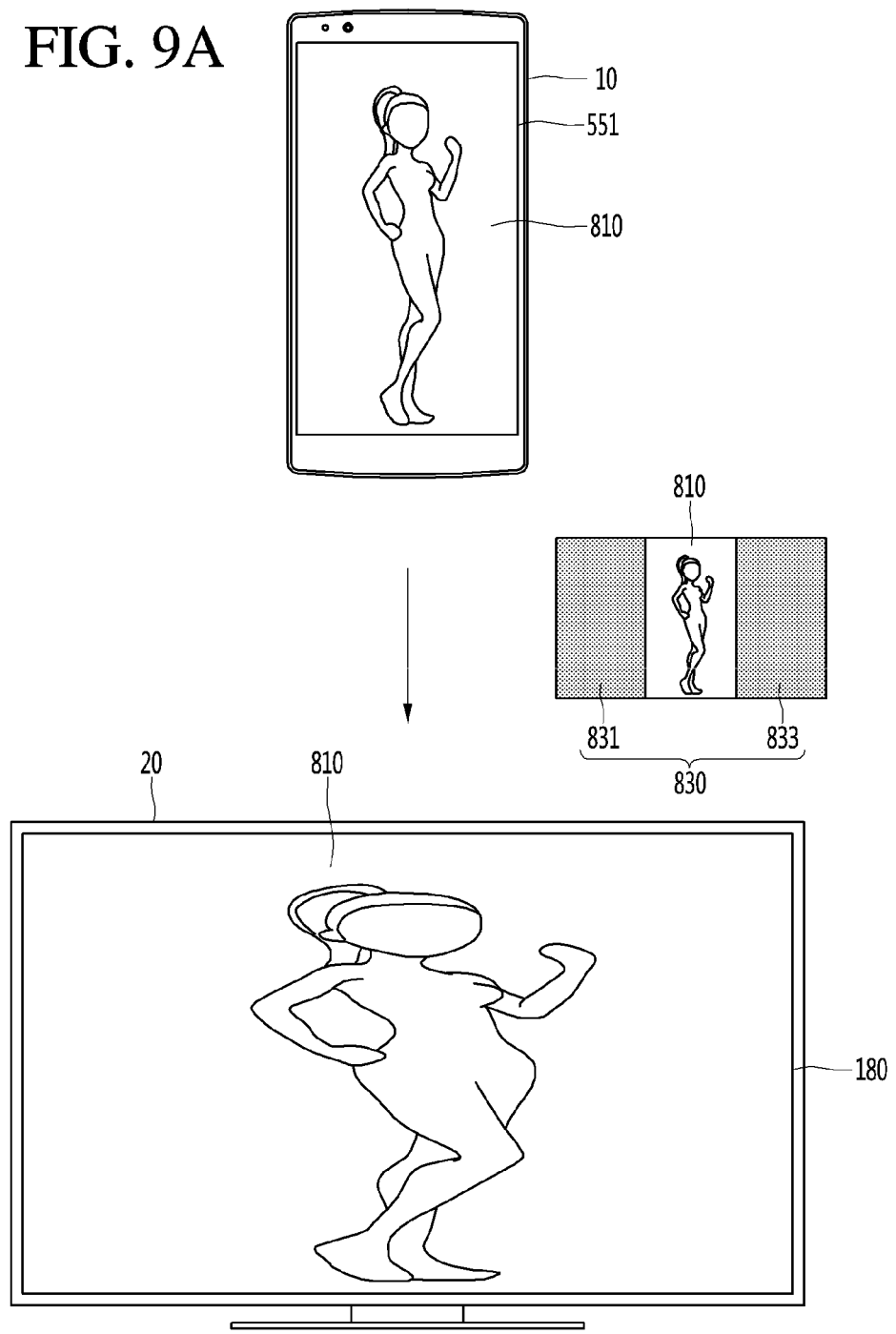
FIGS. 9A to 9D are views illustrating a process for displaying only an image that a WFD source displays in the entire image received from a WFD source according to an embodiment of the present invention.
Figure 9B:
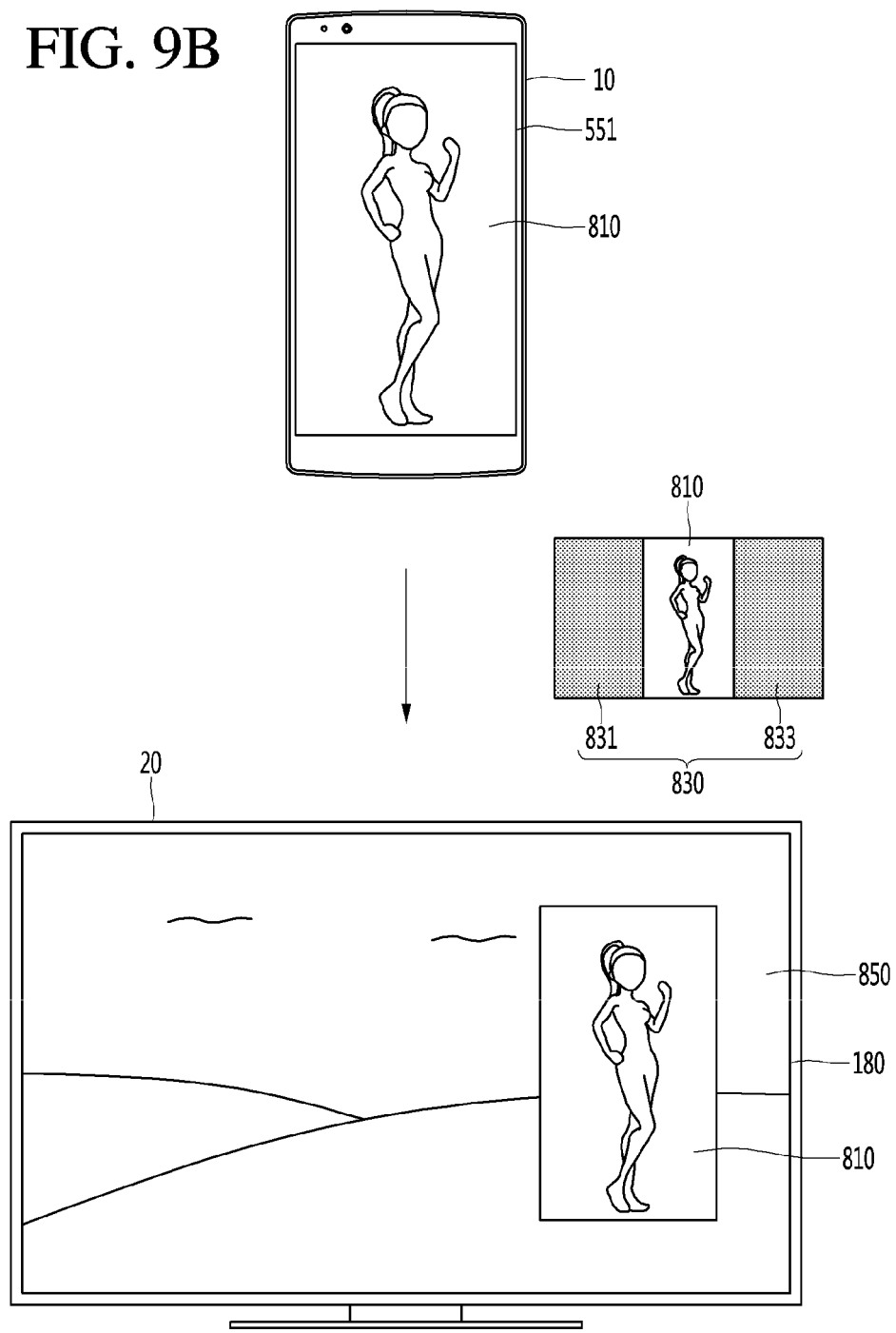
Figure 9C:
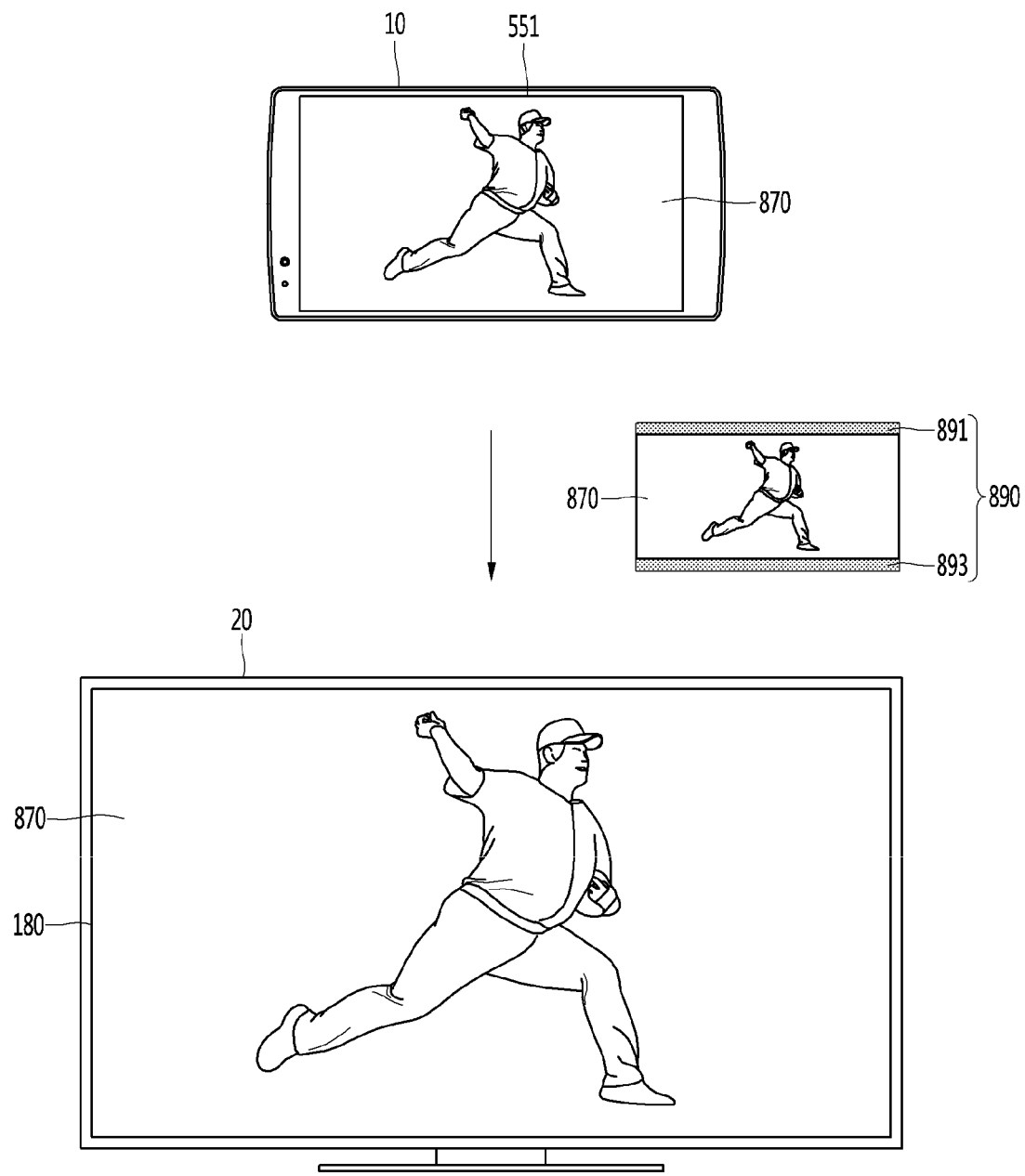

FIG. 9A corresponds to FIG. 8A, FIG. 9B corresponds to FIG. 8B, and FIG. 9C corresponds to FIG. 8C.

In FIGS. 9A to 9C, the WFD sink 20 outputs data received from the WFD source 10 in addition to a task (for example, application execution or broadcast program display) being performed by the WFD sink 20. The WFD sink 20 can semi-transparently display received data in order to prevent the received data from covering an existing task being performed by the WFD sink 20. Furthermore, the WFD sink 20 can display a transparency adjustment bar for adjusting the transparency of the received data. In addition, the WFD sink 20 can further display a button for adjusting whether to display received data on the entire screen, a button for adjusting whether to minimize received data, and a button for determining whether to terminate received data. It is apparent that the displayed position and size of received data can be changed by a user input. This will be described later.

Referring to FIG. 9A, the WFD source 10 can insert the second image 830 into the first image 810 being displayed through the display unit 551 to transmit it to the WFD sink 20. The first image 810 being displayed by the WFD source 10 can be an image having an aspect ratio at which a horizontal length is longer than a vertical length. An aspect ratio corresponding to a resolution supported by the WFD sink 20 can be a ratio at which a horizontal length is longer than a vertical length. The WFD source 10 can insert the second image 830 in order to transmit the first image 810 fit for the aspect ratio of the WFD sink 20.

The WFD sink 20 can extract only the second image 830 from the entire image received from the WFD source 10, and remove the extracted second image 830. That is, the WFD sink 20 can crop the left black image 831 of the first image 810 and the right black image 833 of the first image 810 from the entire image. Then, the WFD sink 20 can scale the first image 810 in a state of having the second image 830 removed to fit the aspect ratio of the display unit 180 and output it.

Referring to FIG. 9B, the WFD sink 20 can remove the left black image 831 of the first image 810 and the right black image 833 of the first image 810 from the entire image and display only the first image 810 on the display unit 180 as it is. That is, unlike the embodiment of FIG. 9A, the WFD sink 20 cannot enlarge and display the first image 810 on the entire screen, but displays it on a partial screen of the display unit 180 as it is. That is, in this case, the first image 810 displayed on the WFD sink 20 can be displayed in a PIP form. The WFD sink 20 may be displaying the image 850 of another media content before receiving the first image 810 and the second image 830 from the WFD source 10. If receiving the entire image from the WFD source 10 through a screen sharing service while displaying the image 850 of the other media content, the WFD sink 20 can remove the second image 830 to overlap only the first image 810 on the image 850 of the other media content and display it.

Viewers can watch an image received from the WFD source 10 without a black image on the basis of screen sharing service, and watch the image 850 of the other media content through the WFD sink 20 without interruption.

Moreover, referring to FIG. 9C, the WFD source 10 disposed in a horizontal screen can include the second image 890 other than the first image 870 on the basis of screen sharing service and transmit it to the WFD sink 20. The second image 890 may be a letterbox. The WFD sink 20 can remove only the second image 890 from the first image 870 and the second image 890 received from the WFD source 10. After removing the second image 890, the WFD sink 20 can scale the first image 870 to fit the entire screen size of the display unit 180 and output it.

In FIG. 9B, the WFD source 10 can transmit the first image 810 displayed according to its placement state to the WFD sink 20 as it is. The WFD source 10 can recognize its screen display direction and transmit an image corresponding to the recognized direction to the WFD sink 20. The WFD source 10 can recognize that it is disposed in a horizontal direction or a vertical direction through a gyro sensor. If the WFD source 10 is disposed in a vertical direction having a vertical length longer than a horizontal length, it can transmit the first image 810 in a vertical direction to the WFD sink 20. The WFD sink 20 can display the first image 810 of a vertical direction in a state that the second image 830 is removed.

In FIG. 9C, since the WFD source 10 is disposed in a horizontal direction having a horizontal length longer than a vertical length, it can transmit the first image 870 in a horizontal direction to the WFD sink 20. The WFD sink 20 can display the first image 870 of a horizontal direction in a state that the second image 890 is removed. That is, the WFD source 10 transmits an image fit for its placement direction to the WFD sink 20, so that the WFD sink 20 can display an image to correspond to the placement direction of the WFD source 10. Accordingly, as described with reference to FIG. 8D, regardless of a placement direction of a smartphone, unlike the case of transmitting an image in a vertical direction always, an additional image direction switching task is not required. According to another embodiment of the present invention, in FIG. 9C, the WFD source 10 disposed in a horizontal direction can transmit the first image 870 in a vertical direction to the WFD sink 20. The WFD sink 20 can recognize that the WFD source 10 is disposed in a horizontal direction and automatically switch the vertical direction of the first image 810 to a horizontal direction.

Moreover, if the display mode of the WFD source 10 is changed from a portrait mode to a landscape mode, a first image displayed on the WFD sink 20 can be automatically switched.

Figure 9D:
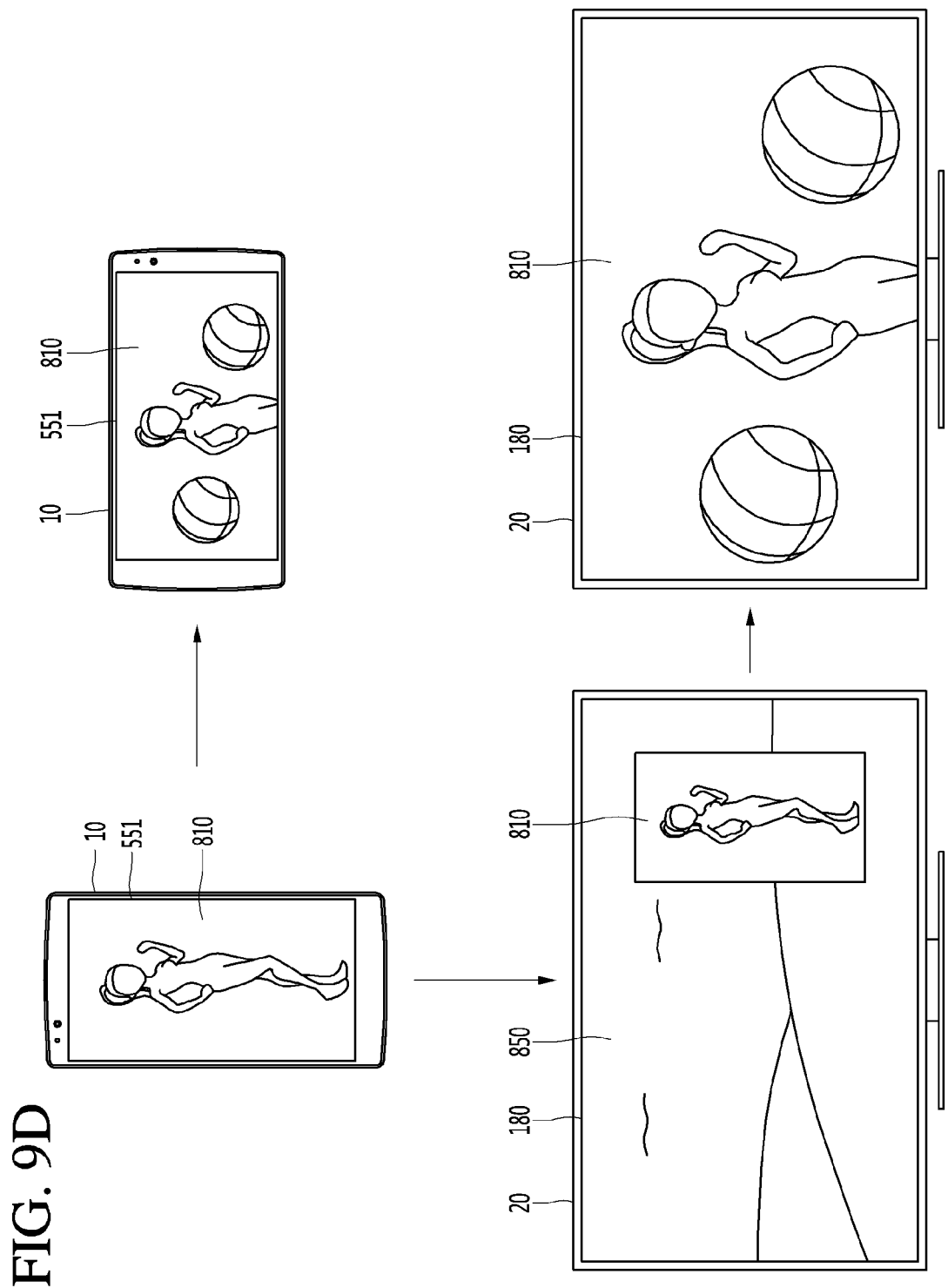

Referring to FIG. 9D, the WFD source 10 is displaying the first image 810 in a portrait mode. The WFD sink 20 can display the image 850 having a second image removed to be overlaid on the image 850 of another media content. That is, the first image 810 can be displayed in a PIP form. At this point, the first image 810 displayed on the WFD sink 20 can be displayed in a portrait form. If the display mode of the WFD source 10 is changed from a portrait mode to a landscape mode, the WFD sink 20 also can switch the first image 810 to a landscape mode and display it. The WFD sink 20 can display the first image 810 on the entire screen of the display unit 180.

If the WFD source 10 transmits the first image 810 in a portrait mode, as shown in FIGS. 9A and 9B, it can insert a black image into the first image 810 and transmit it to the WFD sink 20. The WFD sink 20 can extract the inserted black image and remove the extracted black image to display only the first image 810. If the WFD source 10 is changed from a portrait mode to a landscape mode, it can transmit the first image 810 not including a black image to the WFD sink 20. That is, in this case, the output resolution of the WFD source 10 can be included in a resolution corresponding to an aspect ratio that the WFD sink 20 supports, so that a black image cannot be included in an image to be transmitted. If the display mode of the WFD source 10 is changed to a landscape mode as shown in FIG. 9D, it is assumed and described that the WFD sink 20 displays the first image 810 on the entire screen but the present invention is not limited thereto. The first image 810 can be displayed in a PIP form.

Moreover, according to an embodiment of the present disclosure, a first image having a second image removed can be adjusted.

Figure 10A:
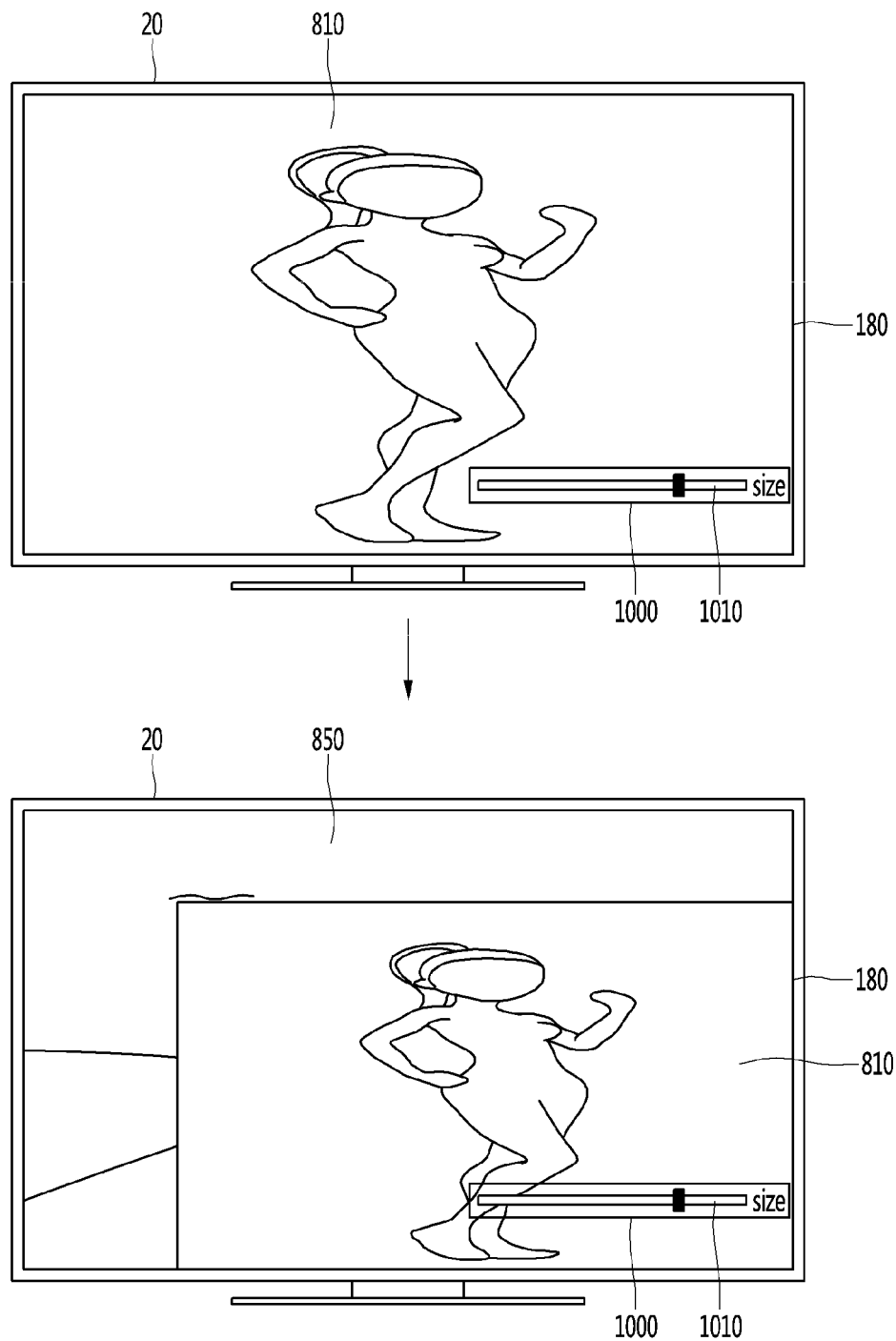
FIGS. 10A and 10B are views of adjusting a first image having a second image removed from the entire image received from a WFD source according to an embodiment of the present invention.
Figure 10B:
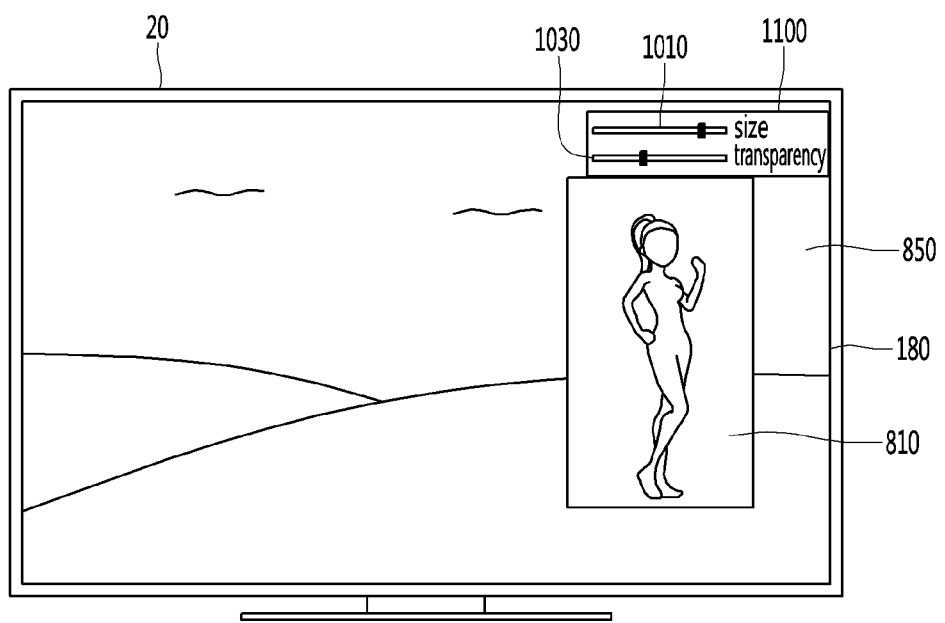

FIGS. 10A and 10B are views of adjusting a first image having a second image removed from the entire image received from a WFD source according to an embodiment of the present invention.

Referring to FIG. 10A, the display unit 180 of the WFD sink 20 displays the first image 810 in the entire image, which is streamed from the WFD source 10, on the entire screen. That is, the WFD sink 20 can display the first image 810 having a second image removed, for example, a black image. The first image 810 can be displayed overlaid on the image 850 of another media content, which is being displayed through the display unit 180 of the WFD sink 20 before the reception of the first image 810.

The WFD sink 20 can further display a mirroring image adjustment window 1000 on a screen. The mirroring image adjustment window 1000 can be a window for adjusting the size or transparency of the first image 810. The mirroring image adjustment window 1000 can be displayed if the first image 810 is displayed through the display unit 180 or the first image 810 is received at the start of a screen sharing service. The mirroring image adjustment window 1000 can include a size adjustment item 1010. The size adjustment item 1010 can be an item for adjusting the size of the first image 810 being received from the WFD source 10. The size adjustment item 1010 can include a size adjustment bar. The WFD sink 20 can adjust the size of the first image 810 based on a control instruction received from the remote control device 200. In more detail, the WFD sink 20 can further display a pointer 205 and adjust the size of the first image 810 by using the pointer 205 according to an instruction received from the remote control device 200. Only the size adjustment item 1010 is shown in FIG. 10A but the present invention is not limited thereto, and if the size of the first image 810 is reduced, an item for adjusting the position of the reduced first image 810 can be further displayed.

Referring to FIG. 10B, the display unit 180 of the WFD sink 20 can display the first image 810 being streamed from the WFD source 10, on a partial screen. In the same manner, the WFD sink 20 can display the first image 810 having a second image removed, for example, a black image. The WFD sink 20 can display the image 850 of media content being played before the screen sharing service, on the entire screen of the display unit 180 and display the first image 810 overlaid on the image 850 of the media content. The WFD sink 20 can display the mirroring image adjustment window 1000 if displaying the first image 810 on the screen of the display unit 180 or receiving the first image 810. According to an embodiment, the mirroring image adjustment window 1000 can be disposed around the first image 810. The mirroring image adjustment window 1000 can be displayed in an OSD form. According to another embodiment, the mirroring image adjustment window 1000 can be disposed overlaid on the first image 810.

The mirroring image adjustment window 1000 can display at least one of a size adjustment item 10100 and a transparency adjustment item 1030. The transparency adjustment item 1030 can be an item for adjusting the transparency of the first image 810. If receiving the first image 810 from the WFD source 10 through a mirroring function or screen sharing service during the displaying of the image 850 of the media content, a user can watch the image 850 of the media content by adjusting the transparency of the first image 810 without interference. Herein, it is assumed and described that the image 850 being displayed on the display unit 180 of the WFD sink 20 before a screen sharing service is an image of media content but the present invention is not limited thereto, and the image 850 can be various forms of screens such as a home screen, a menu screen, and an execution screen of application. A user can adjust the transparency of the first image 810 for multitasking.

Only the size adjustment item 1010 and the transparency adjustment item 1030 are described exemplarily in FIG.

10B, but the present invention is not limited thereto, and an item for changing the position of the first image 810 can be further displayed.

Figure 11:
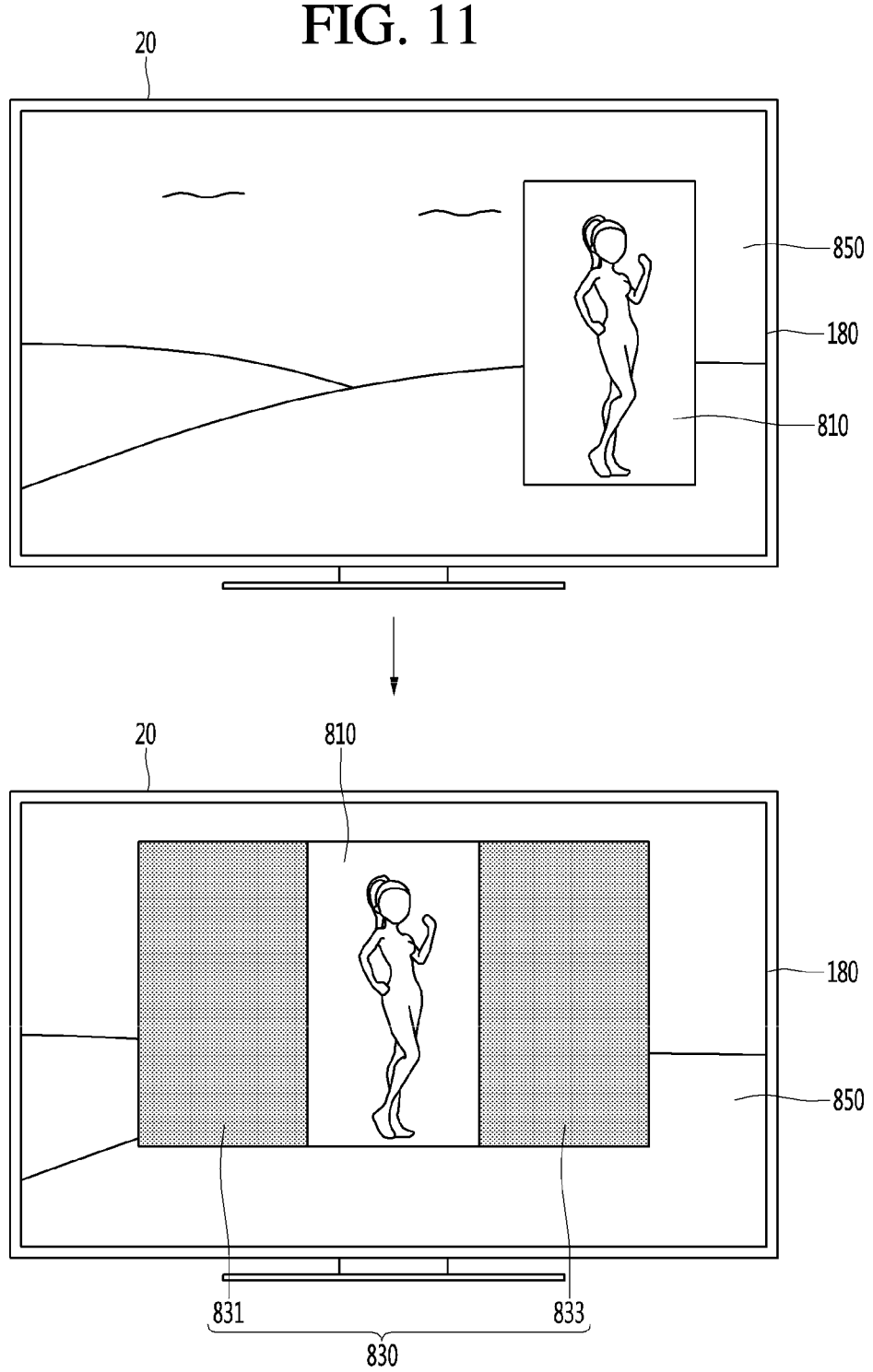
FIG. 11 is a view illustrating a process for returning to an image including a second image while displaying a first image streamed from a WFD source according to an embodiment of the present invention.

FIG. 11 is a view illustrating a process for returning to an image including a second image while displaying a first image streamed from a WFD source according to an embodiment of the present invention.

Description for a portion of FIG. 11 relating to FIG. 9B is omitted.

Referring to FIG. 11, the WFD sink 20 can display the first image 810 having the second image removed from the entire image received from the WRD source 10, on a partial screen of the display unit 180. That is, the first image 810 can be displayed in a PIP form. The WFD sink 20 can receive an instruction for selecting the first image 810. The WFD sink 20 can display the first image 810 and the second image 830 based on the received instruction. That is, as the first image 810 being displayed in a PIP form is selected, the WFD sink 20 can display the entire image itself being received from the WFD source 10 as it is. That is, the WFD sink 20 can restore the second image that is a removed black image. An instruction for selecting the first image 810 can be received from the remote control device 200.

Figure 12A:
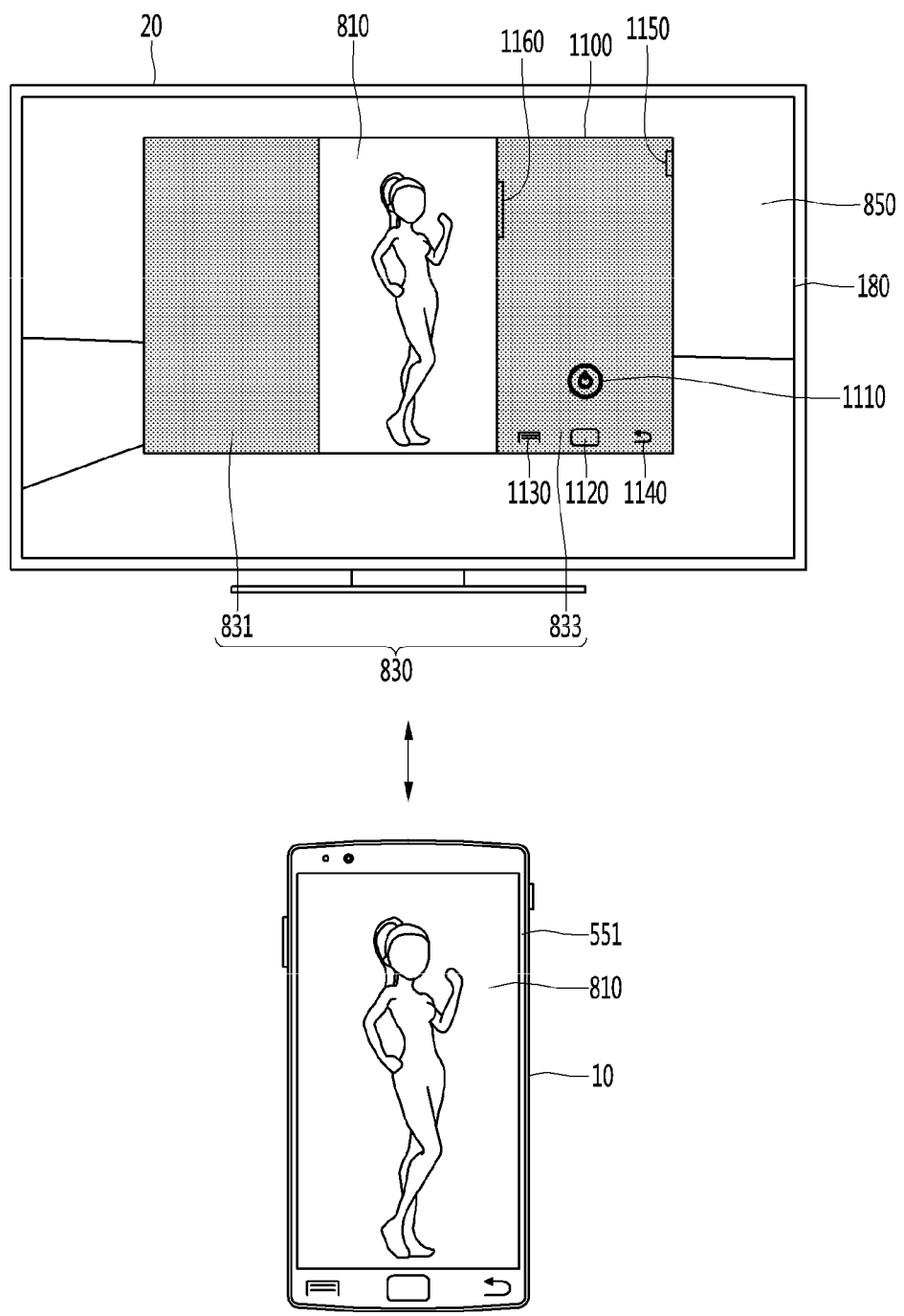
FIGS. 12A to 12C are views illustrating a process for controlling an image being received from a WFD source according to an embodiment of the present invention.
Figure 12B:
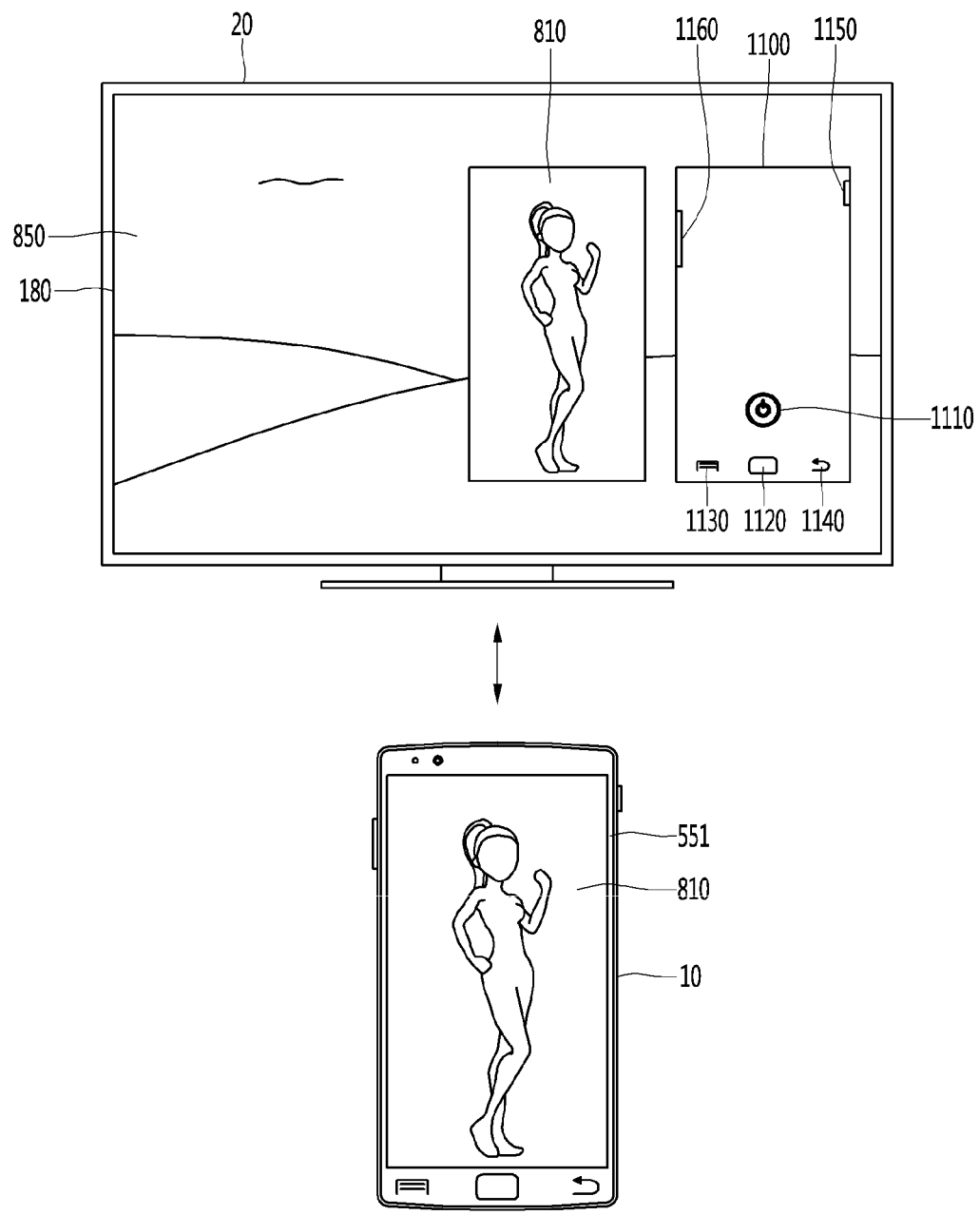
Figure 12C:
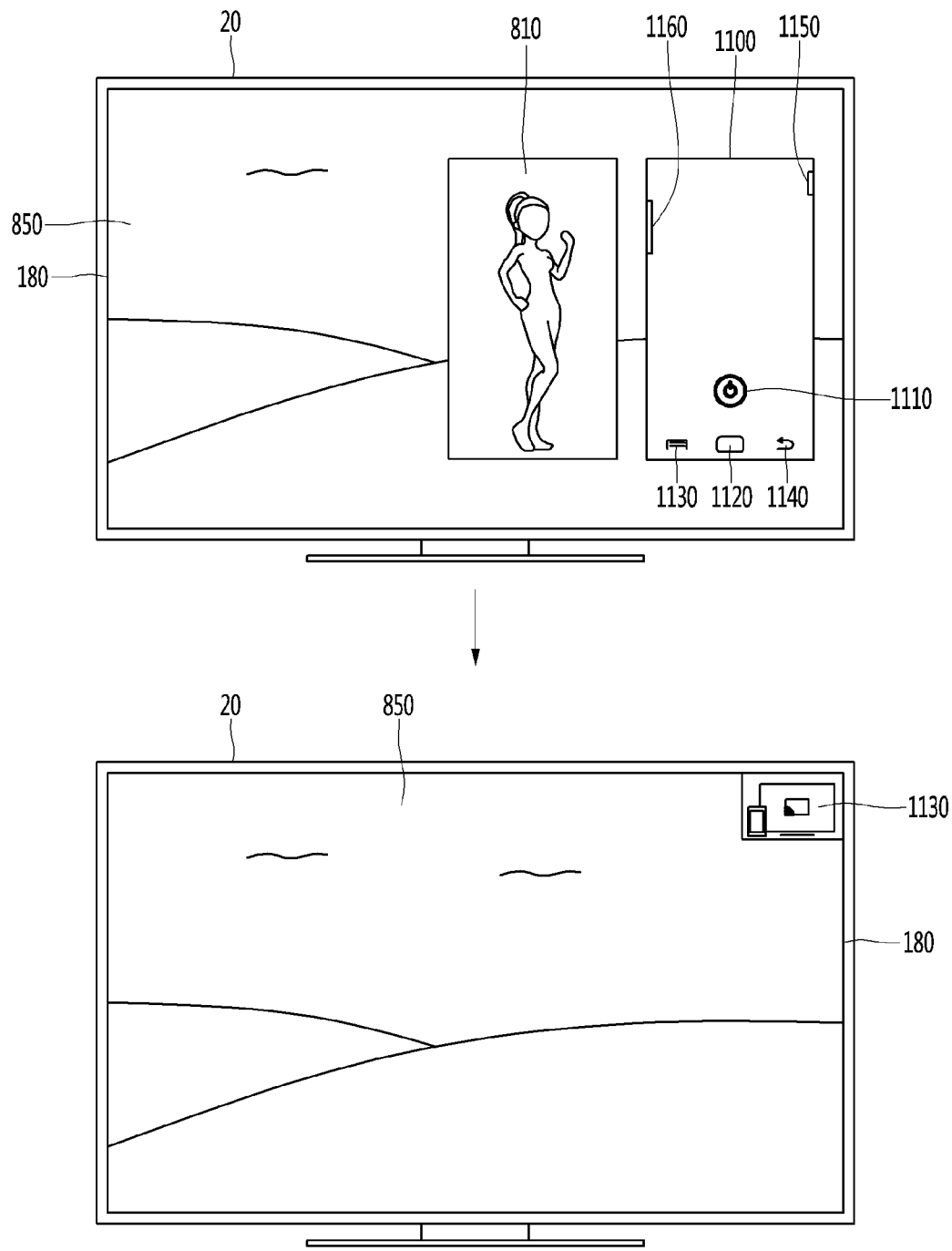

FIGS. 12A to 12C are views illustrating a process for controlling an image being received from a WFD source according to an embodiment of the present invention.

Referring to FIG. 12A, it is assumed that the WFD sink 20 displays the first image 810 and the second image 830 received from the WFD source 10 while displaying the image 850 of media content on the entire screen of the display unit 180. FIG. 12A can represent a state that the removed second image 830 is restored. According to an embodiment, a source control window 1100 including a plurality of virtual buttons for controlling an operation of the WFD source 10 can be displayed on the second image 830. The WFD sink 20 can recognize the second image 830 from the entire image received from the WFD source 10, and display the source control window 1100 on an area where the recognized second image 830 is displayed. At least one of a virtual mirroring open button 1110, a virtual home button 1120, a virtual menu button 1130, a virtual cancel button 1140, a virtual power button 1150, and a virtual volume adjustment button 1160 can be displayed on the source control window 1100. Each button can correspond to a physical key button provided at the WFD source 10. That is, the virtual home button 1120 can correspond to a home button of the WFD source 10; the virtual menu button 1130 can correspond to a menu button; the virtual cancel button 1140 can correspond to a cancel button; the virtual power button 1150 can correspond to a power button; and the virtual volume adjustment button 1160 can correspond to a volume adjustment button. As each virtual button is selected, the function of an actual physical key button can be performed. Each virtual button can be selected through a pointer of the remote control device 200.

The virtual mirroring off button 1110 can be a button for allowing the WFD sink 20 to stop a screen sharing service or service mirroring service with the WFD source 10. If the virtual mirroring off button 1110 is selected, the WFD sink 20 cannot display the first image 810 and the second image 830. That is, the WFD sink 20 can transmit a request message for stopping the screen sharing service to the WFD source 10. The WFD source 10 can stop the transmission of the first image 810 and the second image 830 to the WFD sink 20 in response to the received request message. Accordingly, a user can watch the image 850 of media content in an existing viewing.

Moreover, if the virtual home button 1120 is selected, the WFD sink 20 can transmit a request message for displaying the home screen to the WFD source 10. The WFD source 10 can display the home screen without displaying the first image 810 in playback in response to the received request message. Simultaneously, the WFD source 10 can transmit information on a home screen in display to the WFD sink 20. The WFD sink 20 can switch the first image 810 to the home screen and display it by using the received information on the home screen.

If the virtual menu button 1130 is selected, the WFD source 10 can display a menu screen and the WFD sink 20 can also display a menu screen.

If the virtual cancel button 1140 is selected, the WFD source 10 can display a previously performed task and accordingly, the WFD sink 20 can also display a previous task.

If the virtual power button 1150 is selected, the power of the WFD source 10 can be controlled.

If the virtual volume adjustment button 1160 is selected, the size of a volume outputted from the WFD source 10 can be adjusted.

According to an embodiment of the present invention, the virtual home button 1120, the virtual menu button 1130, the virtual cancel button 1140, the virtual power button 1150, and the virtual volume adjustment button 1160 can be displayed to correspond to the positions of key buttons provided at a mobile terminal. That is, as shown in FIG. 12A, the virtual home button 1120, the virtual menu button 1130, the virtual cancel button 1140, the virtual power button 1150, and the virtual volume adjustment button 1160 can be displayed on the source control window 1100 to correspond to the positions of actual key buttons provided at a mobile terminal.

Furthermore, the source control window 1100 can be disposed on an additional area. Referring to FIG. 12B, the WFD sink 20 displays the image 850 of media content on the entire screen of the display unit 180 and the WFD sink 20 displays only the first image 810 received from the WFD source 10 on a partial screen. That is, it is in a state that the inserted second image 830 is removed. The source control window 1100 can be disposed on an area where the first image 810 is displayed or an area separated from the area where the first image 810 is displayed. If the first image 810 is displayed on the WFD sink 20, the source control window 1100 can be displayed. The WFD sink 20 can display the source control window 1100 in an OSD form.

If the virtual mirroring off button 1110 is selected, the WFD sink 20, as shown in FIG. 12C, can allow the first image 810 to disappear. Simultaneously, the WFD sink 20 can display an indicator 1130 used for displaying a mirroring screen again. That is, if an instruction for selecting the indicator 1130 is received, the WFD sink 20 can display the first image 810 again on a partial screen of the display unit 180. The indicator 1130 can be used to resume the screen sharing service or screen mirroring service with the WFD source 10.

Figure 13A:
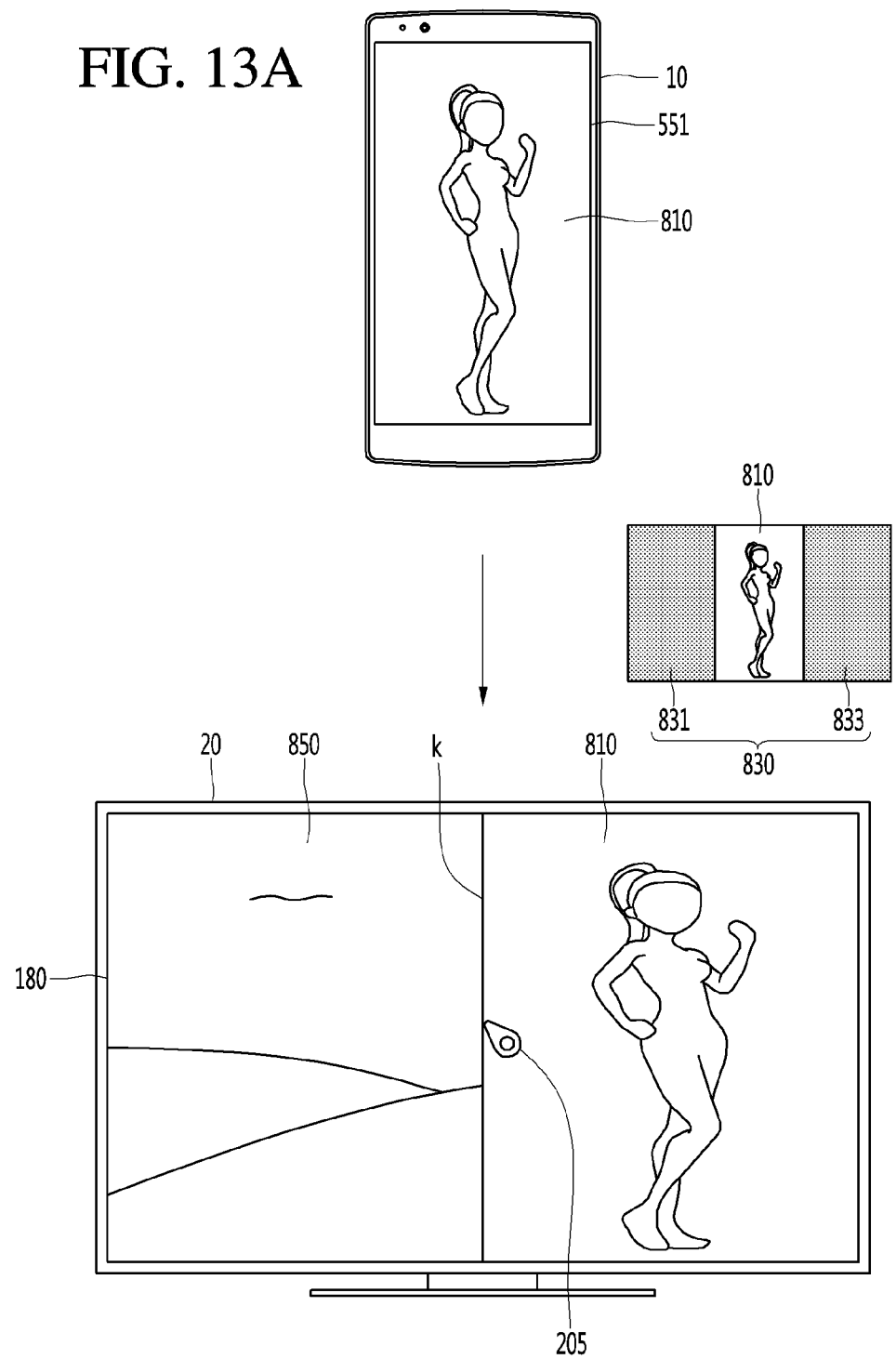
FIGS. 13A to 13C are views illustrating a process for adjusting the distortion of a first image occurring as a second image is removed if the first image received from a WFD source is displayed on a split screen of a WFD sink according to an embodiment of the present invention.
Figure 13B:
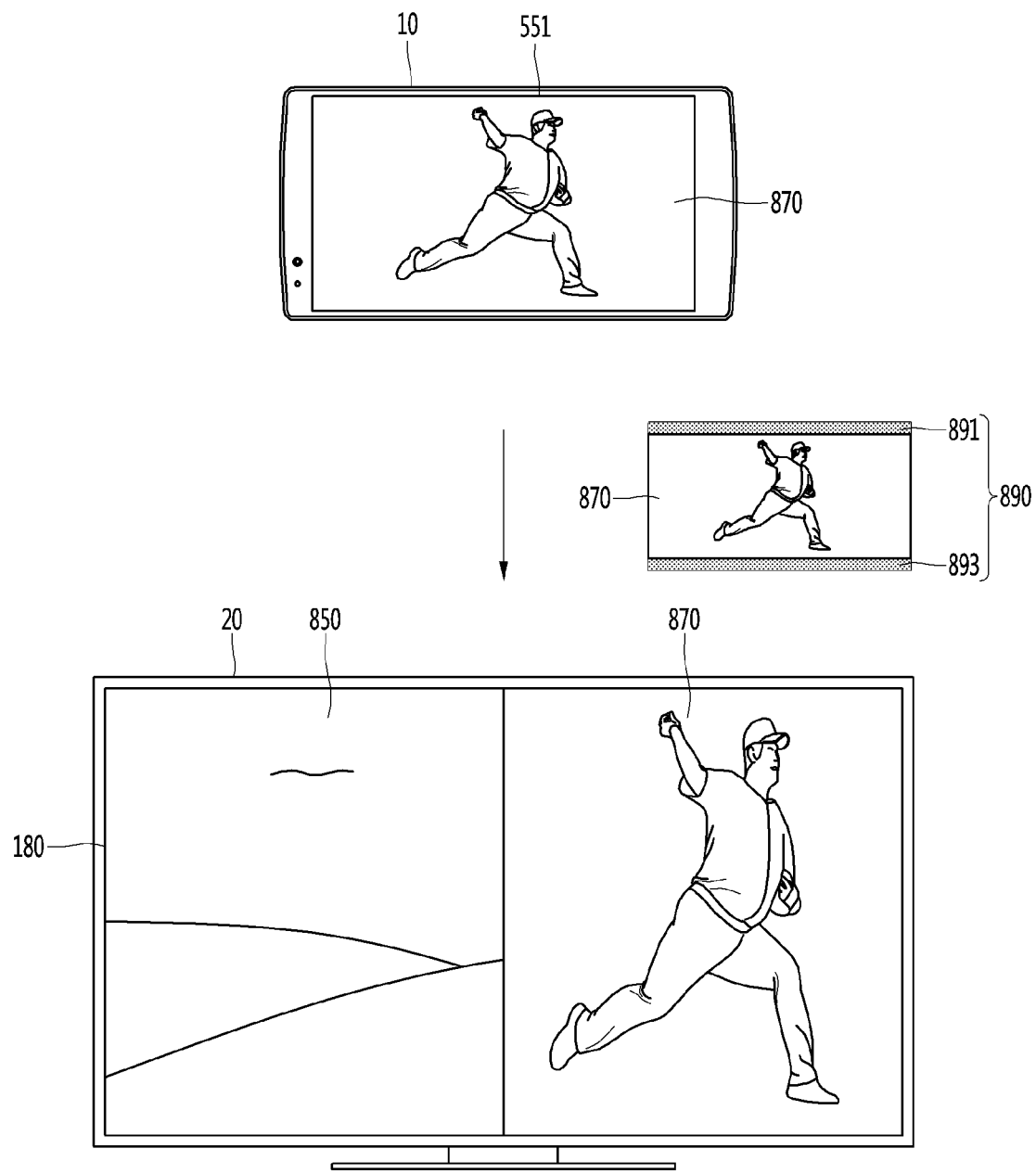
Figure 13C:
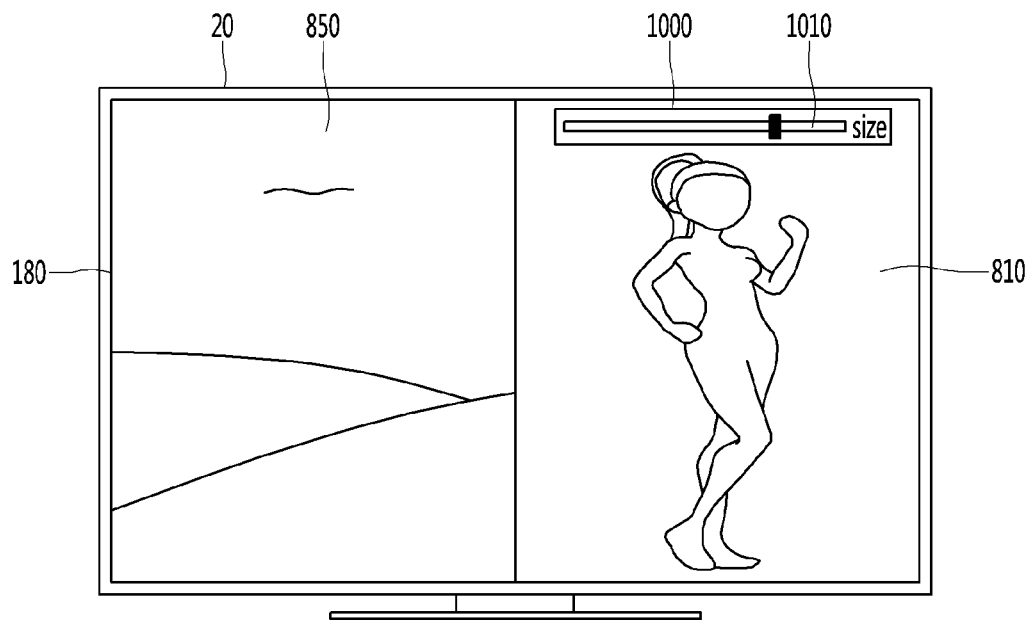

FIGS. 13A to 13C are views illustrating a process for adjusting the distortion of a first image occurring as a second image is removed if the first image received from a WFD source is displayed on a split screen of a WFD sink according to an embodiment of the present invention.

FIG. 13A borrows the description of FIG. 9A and only different parts will be described. Additionally, FIG. 13B borrows the description of FIG. 9B and only different parts will be described.

Referring to FIG. 13A, the WFD sink 20 can display the image 850 of media content and the first image 810 on the respective two split screens of the entire screen. This can correspond to partial mirroring. In this case, the resolution of the first image 810 does not match the resolution of the WFD sink 20 so that the first image 810 can be distorted and displayed. That is, as the WFD source 10 is disposed in a vertical screen (for example, operates in a portrait mode), the output resolution of the first image 810 corresponding thereto is not included in resolutions supported by the WFD sink 20, so that the first image 810 can be distorted and displayed. In FIG. 13A, the WFD sink 20 can further display a pointer 205 moving according to a movement of the remote control device 200. A user can manipulate the position of the boundary K of the first image 810 and the image 850 of media content through the pointer 205 to adjust the size of the first image 810.

In the same manner, as shown in FIG. 13B, if the WFD source 10 is disposed in a horizontal screen, the first image 870 having a black image removed can be also distorted and displayed.

In order to prevent the first image 870 from being distorted and displayed, the WFD sink 20, as shown in FIG. 13C, can display the first image 810 in an undistorted state. That is, the WFD sink 20 can match the first image 810 on a split screen to display only the first image 810 having the second image removed on a screen without distortion. Additionally, the WFD sink 20, as shown in FIG. 13C, can display the mirroring image adjustment window 1000 on an area where the first image 810 is displayed. A user can adjust the size and transparency of the first image 810 that is a mirroring screen by using the mirroring image adjustment window 1000.

Figure 14:
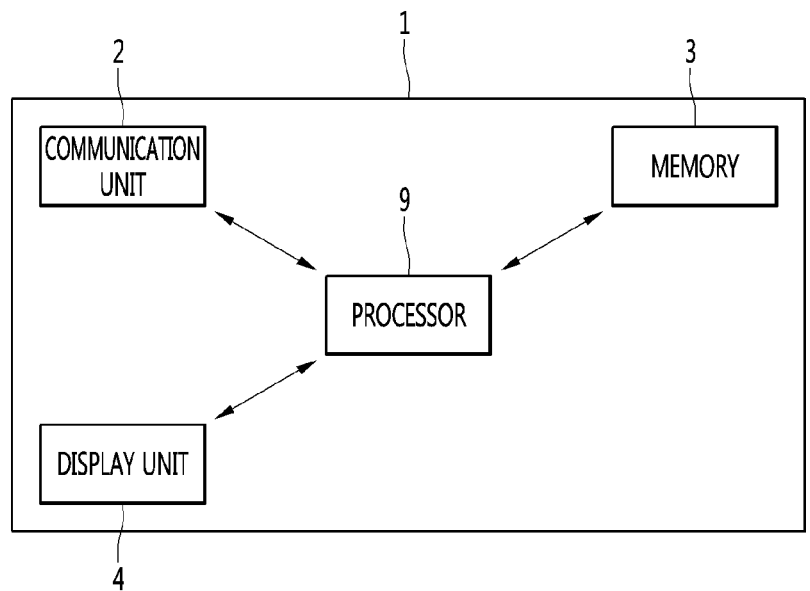
FIG. 14 is a view illustrating a configuration of a wireless device according to an embodiment of the present invention.

FIG. 14 is a view illustrating a configuration of a wireless device according to an embodiment of the present invention.

The wireless device shown in FIG. 14 can be one of the WFD source 10 and the WFD sink 20.

Referring to FIG. 14, a wireless device 1 can include a communication unit 2, a memory 3, a display unit 4, and a processor 9.

The communication unit 2 can transmit/receive wireless signals, and for example, can implement a physical layer according to an IEEE 802 system. The communication unit 2 can be referred to as a transceiver.

The processor 9 can control operations of the communication unit 2, the memory 3, and the display unit 4. The processor 9 can be electrically connected to the communication unit 2 to implement a physical layer and/or a MAC layer according to an IEEE 802 system. Additionally, the processor 9 can be configured to perform audio/video encoding and decoding operations for WFD service. Additionally, a module for implementing an operation of a wireless device according to the above-mentioned various embodiments of the present invention can be stored in the memory 3 and can be executed by the processor 9. The memory 3 can be included in the processor 9 or installed at the outside of the processor 9 to be connected to the processor 9 by a known means. Although not shown in the drawing, the wireless device 1 can further include a sound output unit to output sound.

If the wireless device 1 is the WFD source 10, the WFD source 10 can include all the components of the mobile terminal 500 shown in FIG. 5. In this case, the communication unit 2 of the wireless device 1 can perform all functions of the wireless communication unit 510. Especially the communication unit 2 can include all function of the short-range communication module 514 included in the wireless communication unit 510. Additionally, the memory 3 of the wireless device 1 can correspond to the memory 570 of FIG. 5 and the display unit 4 can correspond to the display unit 551 of FIG. 5. Additionally, the processor 1 can perform all functions of the control unit 580 of FIG. 5.

If the wireless device 1 is the WFD sink 20, the WFD sink 20 can include all the components of the display device 100 shown in FIG. 1. In this case, the communication unit 2 of the wireless device 1 can correspond to the wireless communication unit 173 of FIG. 1; the memory 3 of the wireless device 1 can correspond to the storage unit 140 of FIG. 1; the display unit 4 of the wireless device 1 can correspond to the display unit 180 of FIG. 1; and the processor 9 of the wireless device 1 can correspond to the control unit 170 of FIG. 1.

According to another embodiment of the present invention, the WFD sink 20 removes or does not remove a black image in the entire image being received from the WFD source 10 through a setting of a black image removal mode. For example, the WFD sink 20 can display a menu setting screen for a setting of a black image removal mode, and set whether to remove a black image through the menu setting screen.

Embodiments of the present invention can be supported by standard documents disclosed about at least one of wireless access systems such as an IEEE 802 system, a 3GPP system, a 3GPP LTE and LTE-Advanced (LTE-A) system, a 3GPP2 system, and a Wi-Fi Alliance (WFA) system. That is, steps or parts, which are not described to clearly reveal the technical scope of the present invention in embodiments of the present invention, can be supported by the above documents. In addition, all the terms in the specification can be described by the above standard documents.

According to an embodiment of the present invention, the above-mentioned method can be embodied as computer readable codes on a non-transitory computer readable recording medium having a program thereon. Examples of the computer readable recording medium include ROM, RAM, CD-ROM, magnetic tape, floppy disk, and an optical data storage device and also include carrier waves (e.g., transmission through the Internet).

The above-described display device is not limited to the application of the configurations and methods of the above-described embodiments and the entire or part of the embodiments can be selectively combined and configured to allow various modifications.

What is claimed is:

1. A first wireless device supporting Wi-Fi Direct service, the first wireless device comprising:
   a display;
   a communication unit configured to communicate with a second wireless device; and
   a controller configured to:
   transmit resolution information to the second wireless device by using Real-Time Streaming Protocol (RTSP), the resolution information including a plurality of resolutions that are supported by the first wireless device;
   receive a first image from the second wireless device if a resolution of the first image is included in the resolution information; and
   display the first image on the display.

2. The first wireless device of claim 1, wherein the controller is configured to receive an entire image including the first image and a second image from the second wireless device if the resolution of the first image is not one of the plurality of resolutions, and display the first image by removing the second image from the received entire image,
wherein the second image is an image that is added to the first image such that a resolution of the received entire image corresponds to one of the plurality of resolutions.

3. The first wireless device of claim 2, wherein the resolution of the entire image is selected by the second wireless device from the plurality of resolutions.

4. The first wireless device of claim 3, wherein the controller is further configured to cause the communication unit to receive, from the second wireless device, a message indicating that an image having the resolution that is selected from the plurality of resolutions is to be delivered by using the RTSP.

5. The first wireless device of claim 2, wherein the second image is a black image.

6. The first wireless device of claim 2, wherein the first image is an image that is currently displayed by the second wireless device when the entire image or the first image is received.

7. The first wireless device of claim 2, wherein the controller is further configured to cause the display to:
display an image of media content via an entire screen of the display prior to the receiving of the entire image from the second wireless device; and
display the first image via a partial screen of the display by removing the second image after receiving the entire image.

8. The first wireless device of claim 7, wherein the first image is displayed overlapping the image of media content.

9. The first wireless device of claim 8, wherein the controller is further configured to cause the display to display an image adjustment window for controlling at least one of a size or transparency of the first image such that the image adjustment window is displayed on a first area of the display while the first image is displayed on a second area of the display.

10. The first wireless device of claim 9, wherein the controller is further configured to cause the first image to decrease its size in response to an input applied via the image adjustment window such that the decreased size first image overlaps partially with the image of media content.

11. The first wireless device of claim 9, wherein the controller is further configured to cause the first image to increase its transparency in response to an input applied via the image adjustment window such that the image of media content is visible through the first image with the increased transparency.

12. The first wireless device of claim 7, wherein the controller is further configured to:
cause the display to display a control window including at least one virtual button for controlling an operation of the second wireless device on a first area of the display while the first image is displayed on a second area of the display; and
control an operation of the second wireless device in response to an input applied via the at least one virtual button.

13. The first wireless device of claim 7, wherein the controller is further configured to cause the display to display the second image that is restored at a top/bottom or left/right portion of the first image in response to an input for selecting the first image displayed via the partial screen.

14. The first wireless device of claim 13, wherein the controller is further configured to:

cause the display to display a control window including at least one virtual button for controlling an operation of the second wireless device on an area of the second image; and
control an operation of the second wireless device in response to an input applied via the at least one virtual button.

15. The first wireless device of claim 2, wherein the controller is further configured to cause the display to:
display the first image on an entire screen of the display without the second image; and
display at least one image adjustment window for adjusting a size or a position of the first image, the at least one image adjustment window overlapping the first image.

16. The first wireless device of claim 2, wherein the resolution of the first image that is currently displayed by the second wireless device is not included in the plurality of resolutions when a display mode of the second wireless device is a portrait mode.

17. The first wireless device of claim 16, wherein the controller is further configured to automatically switch the first image to a landscape mode when the display mode of the second wireless device is switched from the portrait mode to the landscape mode.

18. The first wireless device of claim 2, wherein each of resolutions supportable by the first wireless device corresponds to an aspect ratio of which a horizontal length is longer than a vertical length.

19. The first wireless device of claim 2, wherein the controller is further configured to detect the second wireless device prior to performing connection setup to communicate with the second wireless device.

20. A method for controlling a first wireless device supporting Wi-Fi Direct service, the method comprising:
communicating with a second wireless device via a communication unit;
transmitting resolution information to the second wireless device by using Real-Time Streaming Protocol (RTSP), the resolution information including a plurality of resolutions that are supported by the first wireless device;
receiving a first image from the second wireless device if a resolution of the first image is included in the resolution information; and
displaying the first image on the display.

21. A first wireless device supporting Wi-Fi Direct service, the first wireless device comprising:
a display;
a communication unit configured to communicate with a second wireless device; and
a controller configured to:
transmit resolution information to the second wireless device by using Real-Time Streaming Protocol (RTSP), the resolution information including a plurality of resolutions that are supported by the first wireless device;
receive a transmitted image from the second wireless device based on whether a resolution of a first image is included in the resolution information, wherein the transmitted image comprises the first image; and
display at least the first image from the received image information on the display.

22. The first wireless device of claim 21, wherein the transmitted image is the first image when a resolution of the first image is included in the resolution information.

23. The first wireless device of claim 21, wherein the transmitted image comprises the first image and a second image when a resolution of the first image is not one of the plurality of resolutions, wherein the second image is an image that is added to the first image such that a resolution of the first image and the added second image together corresponds to one of the plurality of resolutions.

24. The first wireless device of claim 23, wherein the second image is a black image.

25. The first wireless device of claim 23, where the controller is further configured to:
   display an image of media content via an entire screen of the display prior to the receiving of the transmitted image from the second wireless device; and
   display the first image via a partial screen of the display by removing the second image after receiving the transmitted image.

26. The first wireless device of claim 25, wherein the first image is displayed overlapping the image of media content.

27. The first wireless device of claim 26, wherein the controller is further configured to cause the display to display an image adjustment window for controlling at least one of a size or transparency of the first image such that the image adjustment window is displayed on a first area of the display while the first image is displayed on a second area of the display.

28. The first wireless device of claim 27, wherein the controller is further configured to cause the first image to adjust its size in response to an input applied via the image adjustment window such that the adjusted size first image overlaps partially with the image of media content.

29. The first wireless device of claim 27, wherein the controller is further configured to cause the first image to adjust its transparency in response to an input applied via the image adjustment window such that the image of media content is visible through the first image with the adjusted transparency.

30. The first wireless device of claim 25, wherein the controller is further configured to:
   cause the display to display a control window including at least one virtual button for controlling an operation of the second wireless device on a first area of the display while the first image is displayed on a second area of the display; and
   control an operation of the second wireless device in response to an input applied via the at least one virtual button.

31. The first wireless device of claim 21, wherein the first image is an image that is currently displayed by the second wireless device when the transmitted image is received.

32. The first wireless device of claim 21 wherein the resolution of the first image that is currently displayed by the second wireless device is not included in the plurality of resolutions when a display mode of the second wireless device is a portrait mode.

33. The first wireless device of claim 32, wherein the controller is further configured to automatically switch the first image to a landscape mode when the display mode of the second wireless device is switched from the portrait mode to the landscape mode.

34. The first wireless device of claim 21, wherein the controller is further configured to detect the second wireless device prior to performing connection setup to communicate with the second wireless device.

* * * * *